United States Patent
Kim et al.

(10) Patent No.: US 11,075,703 B2
(45) Date of Patent: Jul. 27, 2021

(54) METHOD FOR CHECKING CHARACTERISTICS OF ELECTRONIC DEVICE AND COMMUNICATION DEVICE INCLUDED IN ELECTRONIC DEVICE

(71) Applicant: Samsung Electronics Co., Ltd., Gyeonggi-do (KR)

(72) Inventors: Jiyong Kim, Gyeonggi-do (KR);
Yeonjeong Kim, Gyeonggi-do (KR);
Jihoon Kim, Gyeonggi-do (KR);
Namkyoung Kim, Gyeonggi-do (KR);
Hyoseok Na, Gyeonggi-do (KR);
Junghwan Son, Gyeonggi-do (KR);
Tongho Chung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/964,854

(22) PCT Filed: Jan. 24, 2019

(86) PCT No.: PCT/KR2019/001033
§ 371 (c)(1),
(2) Date: Jul. 24, 2020

(87) PCT Pub. No.: WO2019/147048
PCT Pub. Date: Aug. 1, 2019

(65) Prior Publication Data
US 2021/0067255 A1    Mar. 4, 2021

(30) Foreign Application Priority Data

Jan. 24, 2018    (KR) .................... 10-2018-0009010

(51) Int. Cl.
*H04W 24/10*    (2009.01)
*H04B 17/12*    (2015.01)
(Continued)

(52) U.S. Cl.
CPC ............. *H04B 17/12* (2015.01); *H04B 17/15* (2015.01); *H04L 27/20* (2013.01); *H04W 24/10* (2013.01)

(58) Field of Classification Search
CPC ... H04L 5/0048; H04L 5/0051; H04L 5/0023; H04L 5/005; H04L 5/0053; H04L 1/1812;
(Continued)

(56) References Cited

U.S. PATENT DOCUMENTS 9,705,611 B1 * 7/2017 West ...................... H04B 17/21
10,291,296 B2 * 5/2019 Gharavi .................. H01Q 3/36
(Continued)

FOREIGN PATENT DOCUMENTS

| JP | 3060002 | 7/2000 |
| KR | 101586424 | 1/2016 |
| WO | WO 2017/132956 | 8/2017 |

OTHER PUBLICATIONS

PCT/ISA/210 Search Report issued on PCT/KR2019/001033, dated Apr. 24, 2019, pp. 5.
(Continued)

*Primary Examiner* — Eva Y Puente
(74) *Attorney, Agent, or Firm* — The Farrell Law Firm, P.C.

(57) ABSTRACT

Various embodiments of the present invention relate to a method for inspecting whether an electronic device and a communication device included in the electronic device operate normally. A method for checking characteristics of a wireless communication device, according to various embodiments of the present invention, comprises the steps of: providing a wireless communication device at a first location, wherein the wireless communication device includes an antenna array and a wireless communication circuit electrically connected to the antenna array, and the
(Continued)

wireless communication circuit is configured to transmit and receive signals having frequencies of 20 Ghz to 100 Ghz and includes a plurality of phase shifters configured to adjust phases of the signals in order to form directional beams together; providing a signal detecting device at a second location separated from the first location so as to detect a wireless signal from the wireless communication device; allowing the wireless communication device to transmit a first signal in a state in which all the phase shifters are configured to have a first delay; detecting a first power of the first signal by using the signal detecting device; allowing the wireless communication device to transmit a second signal in a state in which all the phase shifters are configured to have a second delay; and detecting a second power of the second signal by using the signal detecting device.

20 Claims, 21 Drawing Sheets

(51) Int. Cl.
*H04L 27/20* (2006.01)
*H04B 17/15* (2015.01)

(58) Field of Classification Search
CPC ..... H04L 5/001; H04L 1/0003; H04L 1/0009; H04L 1/0013; H04L 1/0061; H04L 1/0071; H04W 24/10; H04W 72/042; H04W 56/001; H04W 72/0446; H04W 74/0833; H04W 24/08; H04W 84/047; H04W 72/04; H04W 72/0453; H04W 76/27; H04W 16/28; H04W 52/0216; H04W 72/046; H04W 72/048; H04W 72/14; H04W 76/11; H04W 76/28; H04W 92/18; H04W 48/16; H04W 52/0206; H04B 7/0617; H04B 7/0695; H04B 7/088; H04B 7/0413; H04B 7/0626; H04B 17/318; H04B 7/0404; H04B 7/0456; H04B 7/086; H04B 10/11; H04B 10/2575; H04B 10/2581
USPC ........................................... 375/224; 343/853
See application file for complete search history.

(56) References Cited

U.S. PATENT DOCUMENTS

| | | |
|---|---|---|
| 2004/0257288 A1 | 12/2004 | Robertson, Jr. et al. |
| 2006/0284783 A1* | 12/2006 | Mohamadi ........... H01Q 21/065 343/853 |
| 2009/0153394 A1 | 6/2009 | Navarro et al. |
| 2013/0063306 A1 | 3/2013 | Yang |
| 2013/0120190 A1 | 5/2013 | McCune, Jr. |
| 2016/0218429 A1 | 7/2016 | Klemes |
| 2017/0346575 A1 | 11/2017 | Tang et al. |
| 2018/0342802 A1 | 11/2018 | Lyu |
| 2019/0393948 A1* | 12/2019 | Zhao .................... H04B 7/0408 |
| 2021/0014796 A1* | 1/2021 | Cho .................... H04W 52/146 |

OTHER PUBLICATIONS

PCT/ISA/237 Written Opinion issued on PCT/KR2019/001033, dated Apr. 24, 2019, pp. 5.
European Search Report dated Feb. 11, 2021 issued in counterpart application No. 19743981.3-1205, 17 pages.
European Search Report dated May 17, 2021 issued in counterpart application No. 19743981.3-1205, 14 pages.

* cited by examiner

METHOD FOR CHECKING CHARACTERISTICS OF ELECTRONIC DEVICE AND COMMUNICATION DEVICE INCLUDED IN ELECTRONIC DEVICE

PRIORITY

This application is a National Phase Entry of International Application No. PCT/KR2019/001033, which was filed on Jan. 24, 2019, and claims priority to Korean Patent Application No. 10-2018-0009010, filed in the Korean Intellectual Property Office on Jan. 24, 2018, the content of each of which is incorporated herein by reference.

TECHNICAL FIELD

Various embodiments of the disclosure relate to an electronic device, a method for identifying characteristics related to quality of a communication device included in the electronic device, and a system therefor.

BACKGROUND ART

Wireless communication systems have been evolving to support higher data transmission rates in order to satisfy ever-increasing wireless data traffic demands.

Since it is difficult to secure wide frequency bands in frequency bands currently used in the $4^{th}$ generation wireless communication technologies, next-generation (for example, $5^{th}$ generation (5G)) wireless communication technologies using extremely high frequency bands (>20 GHz), which are referred to as millimeter waves (mmWaves), have been developed. In order to alleviate the transmission path loss in the extremely high frequency bands and to increase the transmission delivery distance, there have been ongoing discussions in 5G communication systems with regard to technologies regarding beamforming, massive multi-input multi-output (massive MIMO), full dimensional MIMO (FD-MIMO), array antennas, and large scale antennas.

DISCLOSURE OF INVENTION

Technical Problem

In the case of a wireless communication device including an array antenna, a beam may be formed in a desired direction, or the direction of a beam formed in a first direction may be adjusted to a second direction, by applying a specific delay value to at least one phase shifter.

Unlike a single antenna, if an array antenna is used, the direction of a beam may be adjusted to a desired direction, and this means that, in order to identify whether or not the communication device operates normally, the characteristics of the beam (for example, the strength of the beam) need to be identified with regard to all possible beam directions.

When beam characteristics are to be identified with regard to all possible beam directions, devices for identifying beam characteristics (hereinafter, referred to as signal detecting devices) need to be disposed in all possible beam directions. Alternatively, beam directions may be identified by moving a single signal detecting device according to each beam direction. The former approach may involve difficulties related to the space and cost, and the latter approach may involve difficulties related to the time or space.

Various embodiments of the disclosure may provide a method for inspecting whether or not a communication device included in an electronic device operates normally by using a delay value configured for a phase shifter, and an electronic device therefor.

Solution to Problem

A method for identifying characteristics of a wireless communication device according to various embodiments of the disclosure may include the operations of: providing the wireless communication device in a first position, the wireless communication device including an array of antennas and a wireless communication circuit electrically connected to the array of antennas, the wireless communication circuit being configured to transmit/receive signals having a frequency between 20 GHz to 100 GHz, and the wireless communication circuit including a plurality of phase shifters configured to adjust the phase of the signals to together form a directional beam; providing a signal detecting device in a second position spaced from the first position so as to detect a radio signal from the wireless communication device; causing the wireless communication device to transmit a first signal in a state in which the phase shifters are all configured to have a first delay; detecting first power of the first signal by using the signal detecting device; causing the wireless communication device to transmit a second signal in a state in which the phase shifters are all configured to have a second delay; and detecting second power of the second signal by using the signal detecting device.

An electronic device according to various embodiments of the disclosure may include: a wireless communication device including an array of antennas and a wireless communication circuit electrically connected to the array of antennas, the wireless communication circuit being configured to transmit/receive signals having a frequency between 20 GHz to 100 GHz, the wireless communication circuit including a plurality of phase shifters configured to adjust the phase of the signals to together form a directional beam, and each of the plurality of phase shifters including a designated number of PS elements;
a processor operatively connected to the wireless communication device; and a memory operatively connected to the processor. The memory may be configured to store instructions that, when executed, cause the processor to: receive information regarding an unacceptable element included in the wireless communication device from an external device, the unacceptable element including a PS element included in at least one of the plurality of phase shifters; extract data related to the unacceptable element from a table stored in the memory; and change the extracted data.

A system for identifying characteristics of a wireless communication device according to various embodiments of the disclosure may include: the wireless communication device; a signal detecting device; and a characteristic identifying device. The wireless communication device may include an array of antennas and a wireless communication circuit electrically connected to the array of antennas. The wireless communication circuit may be configured to transmit/receive signals having a frequency between 20 GHz to 100 GHz. The wireless communication circuit may include a plurality of phase shifters configured to adjust the phase of the signals to together form a directional beam. The wireless communication device may be configured to transmit a first signal in a state in which the phase shifters are all configured to have a first delay and to transmit a second signal in a state in which the phase shifters are all configured to have a second delay. The signal detecting device may be configured to receive the first signal and the second signal and to transmit data related to the first signal and the second signal to the characteristic identifying device. The characteristic identifying device may be configured to determine power of the first signal and power of the second signal, based on the data related to the first signal and the second signal, and to identify characteristics regarding quality of the wireless communication device, based on at least one of the determined powers.

Advantageous Effects of Invention

An inspection method according to various embodiments of the disclosure does not directly identify the characteristics of a beam with regard to all possible beam directions, thereby making it possible to efficiently identify beam characteristics in terms of the space, cost, and time.

An inspection method according to various embodiments of the disclosure identifies the characteristics of a beam in a state in which multiple phase shifters for determining the direction of the beam are configured to have the same specific phase value, thereby making it possible to inspect and identify whether or not a communication device included in an electronic device operates normally with a simple configuration and through a minimum number of inspections only.

BEST MODE FOR CARRYING OUT THE INVENTION

Figure 1:
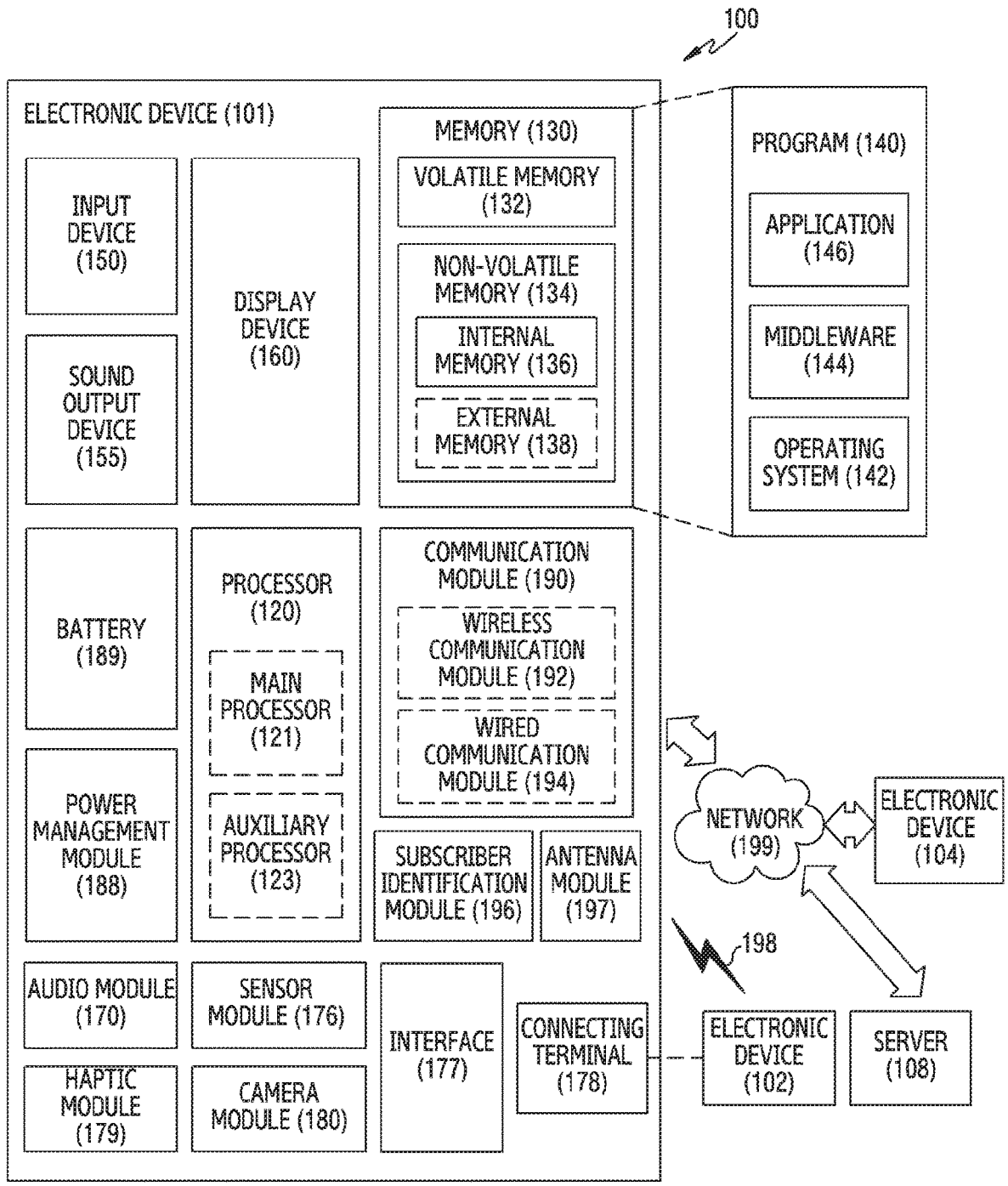
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
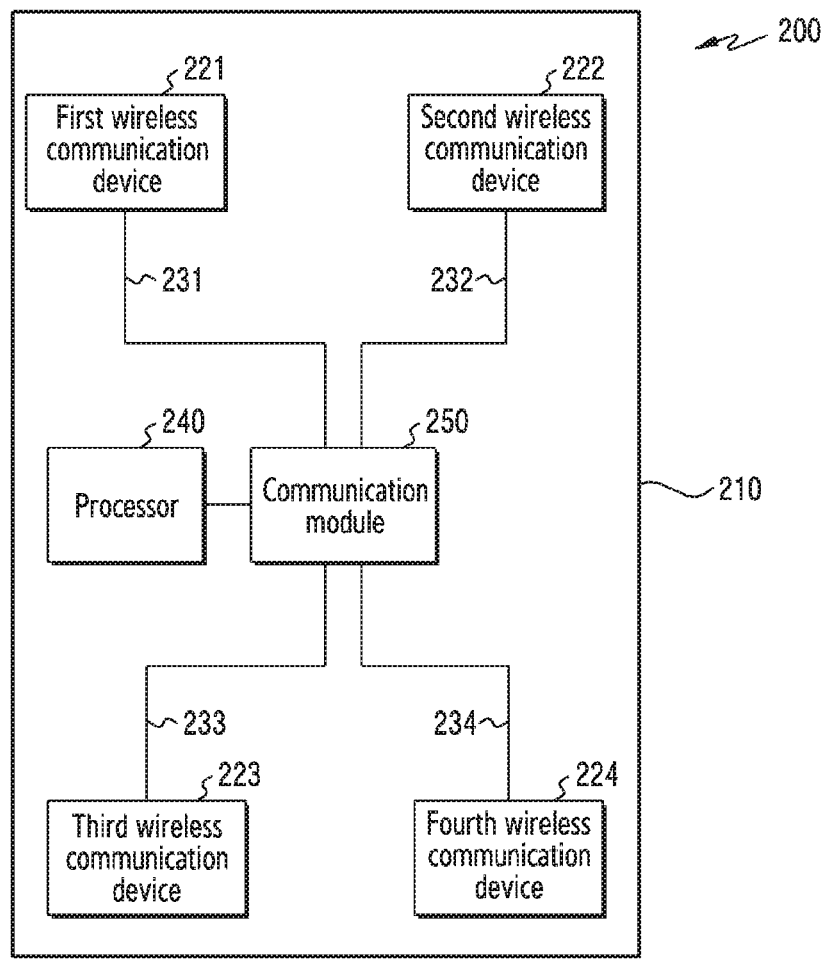
FIG. 2A is a block diagram of an electronic device supporting 5G communication according to various embodiments of the disclosure.

FIG. 2A is a block diagram of an electronic device supporting 5G communication according to various embodiments of the disclosure.

Referring to FIG. 2A, the electronic device 200 may include a housing 210, a processor 240, a communication module 250 (for example, communication module 190 in FIG. 1), a first wireless communication device 221, a second wireless communication device 222, a third wireless communication device 223, a fourth wireless communication device 224, a first conductive line 231, a second conductive line 232, a third conductive line 233, or a fourth conductive line 234.

According to an embodiment, the electronic device 200 may be the electronic device 101.

According to an embodiment, the housing 210 may protect other components of the electronic device 200. The housing 210 may include, for example, a front plate, a back plate facing away from the front plate, and a side member (or metal frame) attached to the back plate or formed integrally with the back plate so as to surround the space between the front plate and the back plate.

According to an embodiment, the electronic device 200 may include at least one of a first wireless communication device 221, a second wireless communication device 222, a third wireless communication device 223, or a fourth wireless communication device 224.

According to an embodiment, the first wireless communication device 221, the second wireless communication device 222, the third wireless communication device 223, or the fourth wireless communication device 224 may be positioned inside the housing 210. According to an embodiment, when seen from above the back plate of the electronic device 200, the first wireless communication device 221 may be disposed on the left upper end of the electronic device 200, the second wireless communication device 222 may be disposed on the right upper end of the electronic device 200, the third wireless communication device 223 may be disposed on the left lower end of the electronic device 200, and the fourth wireless communication device 224 may be disposed on the right lower end of the electronic device 200.

According to an embodiment, the processor 240 may include at least one of a central processing device, an application processor, a graphic processing unit (GPU), a camera image signal processor, or a baseband processor (or communication processor (CP)). According to an embodiment, the processor 240 may be implemented as a system on chip (SoC) or a system in package (SiP).

According to an embodiment, the communication module 250 may be electrically connected to the first wireless communication device 221, the second wireless communication device 222, the third wireless communication device 223, or the fourth wireless communication device 224 by using a first conducive line 231, a second conducive line 232, a third conducive line 233, or a fourth conducive line 234. The communication module 250 may include, for example, a baseband processor or at least one communication circuit (for example, IFIC or RFIC). The communication module 250 may include, for example, a baseband processor separate from the processor 240 (for example, application processor (AP)). The first conductive line 231, the second conductive line 232, the third conductive line 233, or the fourth conductive line 234 may include, for example, a coaxial cable or an FPCB.

According to an embodiment, the communication module 250 may include a first baseband processor (BP) (not illustrated), or a second baseband processor (BP) (not illustrated). The electronic device 200 may further include at least one interface for supporting inter-chip communication between the first BP (or second BP) and the processor 240. The processor 240 and the first BP or the second BP may transmit/receive data by using the inter-chip interface (inter-processor communication channel).

According to an embodiment, the first BP or the second BP may provide an interface for communicating with other entities. The first BP may support wireless communication regarding a first network (not illustrated), for example. The second BP may support wireless communication regarding a second network (not illustrated), for example.

According to an embodiment, the first BP or the second BP may form a single module with the processor 240. For example, the first BP or the second BP may be integrally formed with the processor 240. As another example, the first BP or the second BP may be disposed inside a single chip, or formed as an independent chip. According to an embodiment, the processor 240 and at least one baseband processor (for example, first BP) may be integrally formed inside a single chip (SoC chip), and another baseband processor (for example, second BP) may be formed as an independent chip.

According to an embodiment, the first network (not illustrated) or the second network (not illustrated) may correspond to the network 199 in FIG. 1. According to an embodiment, the first network (not illustrated) and the second network (not illustrated) may include a $4^{th}$ generation (4G) network and a $5^{th}$ generation (5G) network, respectively. The 4G network may support a long term evolution (LTE) protocol specified by 3GPP, for example. The 5G network may support a new radio (NR) protocol specified by 3GPP, for example.

Figure 2B:
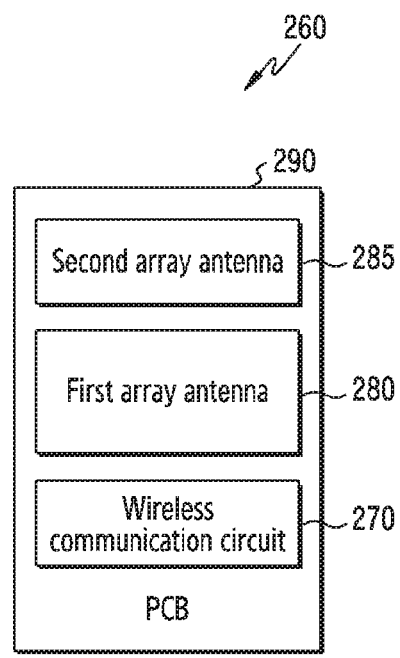
FIG. 2B is a block diagram of a wireless communication device according to various embodiments of the disclosure.

FIG. 2B is a block diagram of a wireless communication device according to various embodiments of the disclosure.

Referring to FIG. 2B, the wireless communication device 260 (for example, first wireless communication device 221, second wireless communication device 222, third wireless communication device 223, or fourth wireless communication device 224 in FIG. 2A) may include a wireless communication circuit 270 (for example, RFIC), a PCB 290, a first array antenna 280, or a second array antenna 285.

According to an embodiment, the wireless communication circuit 270, the first array antenna 280, or the second array antenna 285 may be positioned on the PCB 290. For example, the first array antenna 280 or the second array antenna 285 may be positioned on the first surface of the PCB 290, and the wireless communication circuit 270 may be positioned on the second surface of the PCB 290. The PCB 290 may include a connector (for example, coaxial cable connector or board-to-board (B-to-B) connector) to be electrically connected to another PCB (for example, PCB on which the communication module 250 in FIG. 2A is disposed) by using a transmission line (for example, first conductive line 231 in FIG. 2A or coaxial cable). The PCB 290 may be connected to a PCB, on which a communication module 250 is disposed, by using a coaxial cable connector, for example, and the coaxial cable may be used to deliver transmission and reception IF signals or RF signals. As another example, power or other control signals may be delivered through a B-to-B connector.

According to an embodiment, the first array antenna 280 or the second array antenna 285 may include multiple antennas. The antennas may include a patch antenna, a loop antenna, or a dipole antenna. For example, the antennas included in the first array antenna 280 may be patch antennas for forming a beam toward the back plate of the electronic device 200. As another example, the antennas included in the second array antenna 285 may be dipole antennas or loop antennas for forming a beam toward the side member of the electronic device 200.

According to an embodiment, the wireless communication circuit 270 may support at least a partial band (for example, 24 GHz to 30 GHz or 37 GHz to 40 GHz) among a bandwidth from 20 GHz to 100 GHz. According to an embodiment, the wireless communication circuit 270 may up-convert or down-convert a frequency. For example, the wireless communication circuit 270 included in the wireless communication device 260 (for example, first wireless communication device 221 in FIG. 2A) may up-convert an IF signal received from a communication module (for example, communication module 250 in FIG. 2A) through a conductive line (for example, first conductive line 231 in FIG. 2A) into an RF signal. As another example, the wireless communication circuit 270 included in the wireless communication device 260 (for example, first wireless communication device 221 in FIG. 2A) may down-convert an RF signal (for example, millimeter wave signal) received through the first array antenna 280 or the second array antenna 285 into an IF signal and may transmit the same to a communication module (for example, communication module 250 in FIG. 2A) through a conductive line (for example, first conductive line 231 in FIG. 2A).

Figure 3:
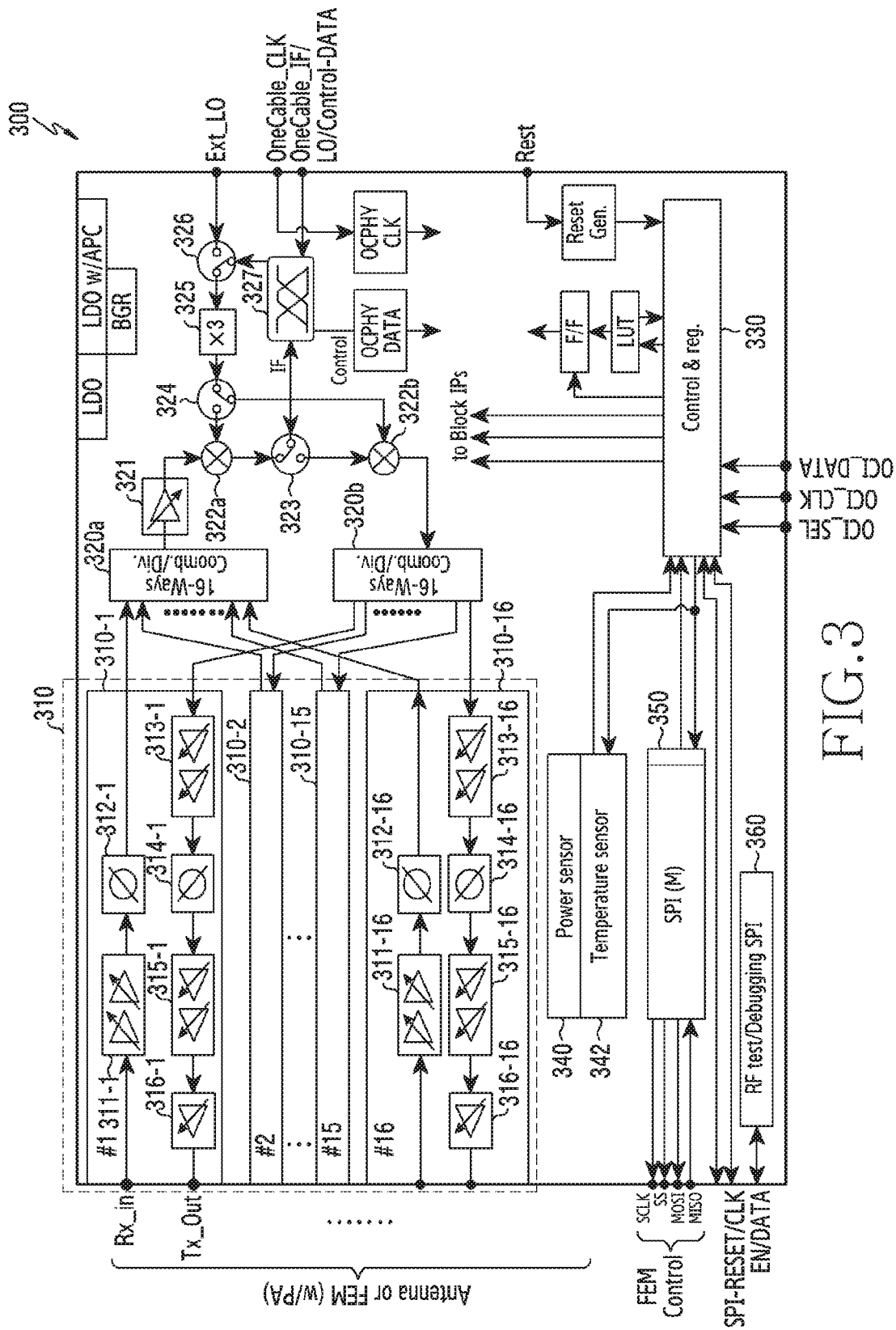
FIG. 3 is a circuit diagram illustrating the detailed structure of a wireless communication circuit according to various embodiments of the disclosure.

FIG. 3 is a circuit diagram illustrating the detailed structure of a wireless communication circuit according to various embodiments of the disclosure.

In an embodiment, the wireless communication circuit 300 illustrated in FIG. 3 may be the wireless communication circuit 270 illustrated in FIG. 2A.

The wireless communication circuit 300 according to various embodiments of the disclosure may include at least one of a transmission/reception signal processing circuit 310, a combiner 320a, a divider 320b, an RBDA 321, a reception mixer 322a, a transmission mixer 322b, transmission/reception conversion switches 323 and 324, a local oscillator 325, a conversion switch 326, a signal divider 327, a controller 330, a power sensor 340, a temperature sensor 342, a serial peripheral interface (SPI) 350, or an RF test SPI 360.

According to various embodiments, the transmission/reception signal processing circuit 310 may include multiple transmission/reception signal processing sub-circuits 310-1 to 310-16. In an embodiment, the number of transmission/reception signal processing sub-circuits included in the transmission/reception signal processing circuit 310 may be determined variously according to the design scheme of the transmission/reception signal processing circuit 310 or the wireless communication circuit 300.

In an embodiment, at least some transmission/reception signal processing sub-circuits (for example, first transmission/reception signal processing sub-circuit 310-1 to fourth transmission/reception signal processing sub-circuit 310-4) among the multiple transmission/reception signal processing sub-circuits 310-1 to 310-16 may be activated under the control of the controller 330. The at least some activated transmission/reception signal processing sub-circuits 310-1 to 310-4 may be connected to antenna elements and used to adjust the direction of a beam to a designated direction. The at least some activated transmission/reception signal processing sub-circuits, or the number of at least some activated transmission/reception signal processing sub-circuits may vary depending on the designated direction or the pattern of the beam to be made. For example, a specific transmission/reception signal processing sub-circuit (for example, third transmission/reception signal processing sub-circuit 310-3) may be activated or deactivated according to the pattern of the beam to be made. Hereinafter, the number of at least some activated transmission/reception signal processing sub-circuits may be designated as N. For example, if N=4, the first transmission/reception signal processing sub-circuit 310-1 to the fourth transmission/reception signal processing sub-circuit 310-4 may be activated.

In an embodiment, the transmission/reception signal processing circuit 310 may be connected to an array antenna. For example, the transmission/reception signal processing circuit 310 may be connected to at least one of the first array antenna 280 or the second array antenna 285.

In an embodiment, the multiple transmission/reception signal processing sub-circuits 310-1 to 310-16 included in the transmission/reception signal processing circuit 310 may correspond to antenna elements included in an array antenna. For example, at least some of the multiple transmission/reception signal processing sub-circuits 310-1 to 310-16 may be connected to antenna elements included in the first array antenna 280. As another example, at least some of the multiple transmission/reception signal processing sub-circuits 310-1 to 310-16 may be connected to antenna elements included in the second array antenna 285. As still another example, at least some of the multiple transmission/reception signal processing sub-circuits 310-1 to 310-16 may be connected to antenna elements included in the first array antenna 280 and the second array antenna 285.

In an embodiment, one transmission/reception signal processing sub-circuit (for example, first transmission/reception signal processing sub-circuit 310-1) may be connected to one antenna element (for example, one antenna element included in the first array antenna 280). In another embodiment, two or more transmission/reception signal processing sub-circuits (for example, first transmission/reception signal processing sub-circuit 3101-1 to second transmission/reception signal processing sub-circuit 310-2) may be connected to one antenna element.

According to various embodiments, one transmission/reception signal processing sub-circuit (for example, first transmission/reception signal processing sub-circuit 310-1) may include at least one of a low-noise amplifier (LNA) (for example, first LNA 311-1), a phase shifter for reception (reception PS) (for example, first reception PS 312-1), a phase shifter drive amplifier (PSDA) (for example, first PSDA 313-1), a phase shifter for transmission (transmission PS) (for example, first transmission PS 314-1), a pre-power amplifier (PPA) (for example, first PPA 315-1), or a power amplifier (PA) (for example, first PA 316-1). For example, the transmission/reception signal processing circuit 310 may be an RF chain. For example, the wireless communication circuit 300 may be configured to support a multi-chain RF system.

In an embodiment, at least one of the LNA (for example, first LNA 311-1), the reception PS (for example, first reception PS 312-1), the PSDA (for example, first PSDA 313-1), the transmission PS (for example, first transmission PS 314-1), the PPA (for example, first PPA 315-1), or the PA (for example, first PS 316) may be numbered in the same type as the multiple transmission/reception signal processing sub-circuits 310-1 to 310-16. For example, the transmission/reception signal processing sub-circuit 310-1 may include the first LLN 311-1, the first reception PS 312-2, the first PSDA 313-1, the first transmission 314-1, the first PPA 315-1, and the first PA 316-1.

According to various embodiments, the wireless communication circuit 300 may perform a reception function of converting an RF signal in a millimeter-wave band, which is input from an antenna element, into an IF signal in an intermediate frequency band and delivering the same to an RF stage (for example, communication module 250) of the next end, and a transmission function of converting an IF signal in the intermediate frequency band, which is input from the RF stage (for example, communication module 250) into an RF signal in the millimeter-wave band and delivering the same to the antenna element.

According to various embodiments, the wireless communication circuit 300 or each transmission/reception signal processing circuit may have a transmission (TX) path and a reception (RX) path for transmitting/receiving a super-high-frequency radio signal according to a time division multiple access (TDMA) scheme. For example, in connection with the first transmission/reception signal processing sub-circuit 310-1, the TX path may include at least one of a first PSDA 313-1, a first TX PS 314-1, a first PPA 315-1, or a first PA 316-1, and the RX path may include at least one of a first LNA 311-1 or a first RX PS 312-1.

Hereinafter, components included in the first TX/RX signal processing sub-circuit 310-1 will be described. Components included in the second TX/RX signal processing sub-circuit 310-2 to the 16$^{th}$ transmission/reception signal processing sub-circuit 310-16 may be identical or similar to the components included in the first TX/RX signal processing sub-circuit 310-1.

The first LNA 311-1 is an amplifier which is positioned at the next end of the antenna element so as to amplify a received RF signal, and which is designed to have low noise in order to optimize the overall system noise performance.

The first RX PS 312-1 may perform a function of converting the phase of a signal input from the first LNA 311-1. For example, the first RX PS 312-1 may convert the phase of an input signal that has been input from the LNA 311-1 and may output a signal having the converted phase. For example, the first RX PS 312-1 may lag the phase of the input signal. One of multiple phase values may be configured for the first RX PS 312-1. Each of the multiple phase values may correspond to one of angles in the range of 0-360°, and different phase values may correspond to different angles. For example, if the first RX PS 312-1 is formed by four bits, one of a total of 16 phase values obtained by the range of 0-337.5° at an interval of 22.5° may be configured for the first RX PS 312-1. As another example, if the first RX PS 312-1 is formed by five bits, one of a total of 32 phase values obtained by the range of 0-348.75° at an interval of 11.25° may be configured for the first RX PS 312-1. For example, if 22.5° is configured for the RX PS 312-1, the first RX PS 312-1 may convert the phase of an input signal to 22.5° and may output a signal having the converted signal. In an embodiment, the converted phase may be referred to as a phase delay.

The first PSDA 313-1 may be positioned at the TX end of a multi-chain RF system for a phase-converted array system. The first PSDA 313-1 may perform an amplification function for compensating for a loss of a power divider positioned in front of/behind the same and a loss occurring in the first TX PS 314-1.

The first TX PS 314-1 may perform a function of changing the phase of a signal that has been input, as in the case of the first RX PS 312-1. For example, if 22.5° is configured for the first TX PS 314-1, the first TX PS 314-1 may convert the phase of an input signal to 22.5°, and may output a signal having the converted phase.

The first PPA 315-1 may include an amplifier positioned at the front end of the first PA 316-1 so as to vary the strength of a signal input to the first PA 316-1. The first PA 316-1 may include an amplifier positioned at the rear end of the transmitter so as to amplify an RF signal, to minimize distortion of an output signal, and to maintain high-efficiency characteristics. According to various embodiments, a power level detection circuit such as a transmitter signal strength indictor (TSSI) may be embedded at the rear end of the first PA 316-1.

The TX/RX signal processing circuit 310 of the wireless communication circuit 300 may be connected to an array antenna. In an embodiment, the array antenna connected to the TX/RX signal processing circuit 310 may be an array antenna (for example, 4×4 array antenna) including 16 antenna elements.

According to an embodiment, a combiner 320a may be included between the multiple TX/RX signal processing sub-circuits 310-1 to 310-16 and the TX/RX conversion switches 323 and 324, in order to combine RX signals in RX paths of the 16 TX/RX signal processing sub-circuits 310-1 to 310-16. For example, the combiner 320a may be implemented as a 16-way combiner/divider. In an embodiment, a divider 320b may be included to divide TX signals to TX paths of the 16 TX/RX signal processing sub-circuits 310-1 to 310-16. For example, the divider 320b may be implemented as a 16-way combiner/divider.

According to various embodiments, the configuration and installation position of the amplification stage for amplifying TX and RX signals in the wireless communication circuit 300 may be diversified. According to various embodiments, the wireless communication circuit 300 or the TX/RX signal processing circuit 310 may further include a filter or the like for filtering TX and RX signals, respectively.

According to various embodiments, the wireless communication circuit 300 may include a frequency up/down converter for up-converting a TX signal (for example, IF signal) transmitted from the communication module 250 into a radio signal (RF signal) in a super-high-frequency band or for frequency-down-converting an RX signal in the super-high-frequency band into an IF signal. For example, the frequency up/down converter may include a local oscillator 325, an RX mixer 322a, a TX mixer 32b, or the like. According to various embodiments, if the communication module 250 is configured to transmit a signal in the super-high-frequency band for wireless transmission, the wireless communication circuit 300 may not include the frequency up/down converter.

According to various embodiments, the local oscillator 325 of the frequency up/down converter, which may be included in the wireless communication circuit 300, may be configured to independently generate a local signal, but may also be configured to generate a local signal (LO_A) by using (for example, frequency multiplication) a reference local signal transmitted from the communication module 250 included in the main PCB, for example, for the purpose of signal synchronization. For example, the IF signal may be 11.xGHz (for example, 11.2 GHz), the reference local signal may be 5.xGHz (for example, 5.6 GHz), and the local oscillator 325 may produce a local signal (16.8 GHz), which is obtained by multiplying the reference local signal by three, so as to produce a wirelessly-transmitted super-high-frequency signal (for example, 28 GHz). The reference local signal may be, for example, between 5-6 GHz. The IF signal may be, for example, between 10-12 GHz. The wirelessly-transmitted super-high-frequency signal may be, for example, between 20-100 GHz.

A signal sensed by the power sensor 340 or the temperature sensor 342 may be supplied to the controller 330, and the controller 330 may transmit a control signal, based on the sensed value, to each function block requiring the sensed value.

The SPI 350 may provide a serial communication interface with a peripheral device, and may transmit data received from the peripheral device to the controller 330, or may transmit a control signal received from the controller 330 to each peripheral device. The RF test/debugging SPI 360 may provide an interface for test or debugging of the wireless communication circuit 300.

According to various embodiments, the wireless communication circuit 300 may include a controller 330 for controlling operations of the wireless communication circuit 300. The controller 330 may receive a control signal from the communication module 250 and may perform TX/RX switching control, beamforming control, and the like inside the wireless communication circuit 300.

According to various embodiments, signals provided from the communication module 250 to the wireless communication circuit 300 may include an IF signal, a reference local signal, and a control signal. For example, the signals may be implemented in different frequency bands, respectively, and provided as a frequency signal combined through a single coaxial cable. The wireless communication circuit 300 may include a signal divider 327 having a filter combiner/divider structure for separating a frequency-combined signal provided from the communication module 250 into each IF signal, reference local signal, or control signal. For example, if the IF signal is 11.2 GHz, and if the reference local signal is 5.6 GHz, the control signal may be designed to be 2 GHz or less. The signal divider 327 may include, for example, a triplexer for frequency-separating/combining the IF signal, the reference local signal, or the control signal, and may also include multiple filters (for example, low-band filter, high-band filter, band filter, and the like).

Figure 4:
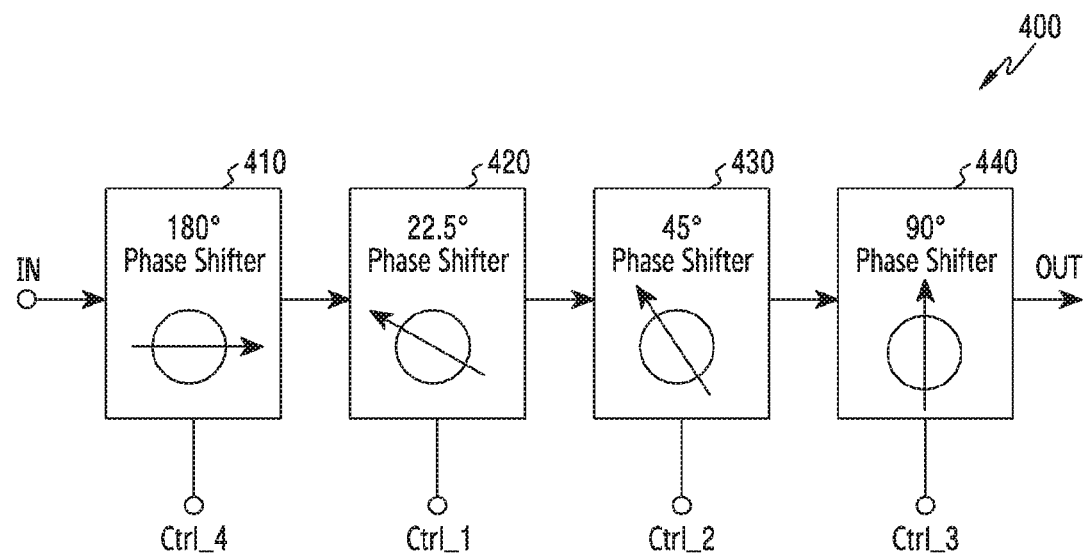
FIG. 4 is a circuit diagram illustrating the detailed structure of a PS according to various embodiments of the disclosure.

FIG. 4 is a circuit diagram illustrating the detailed structure of a PS according to various embodiments of the disclosure.

In an embodiment, the PS 400 illustrated in FIG. 4 may include at least one of the first TX PS 314-1 or the first RX PS 312-1 in FIG. 3.

Referring to FIG. 4, the PS 400 may include multiple PS elements 410-440. In an embodiment, the PS 400 may be included in a single TX/RX signal processing sub-circuit. For example, the PS 400 may be included in the first TX/RX signal processing sub-circuit 310-1, and the PS 400 in this case may be the first TX PS 314-1 or the first RX PS 312-1.

In an embodiment, if 22.5° is configured for the PS 400, the PS 400 may convert the phase of an input signal to 22.5° and may output a signal having the converted phase, and the signal having the converted phase may be transmitted as a directional beam from an antenna element corresponding to the PS 400. For example, if the PS 400 is the first TX PS 314-1, and if 22.5° is configured for the first TX PS 314-1, the signal, the phase of which is converted to 22.5° by the TX PS 314-1, may be amplified by the first PPA 315-1 and the first PA 316-1, and may then be transmitted as a directional beam from an antenna element connected to the TX/RX signal processing sub-circuit 310-1.

According to various embodiments, the number of the multiple PS elements 410-440 may be determined according to the bit configuration of the PS 400. For example, if the PS 400 has a four-bit configuration as illustrated in FIG. 4, the PS 400 may include four PS elements. As another example, if the PS 400 has a five-bit configuration, the PS 400 may include five PS elements.

According to various embodiments, the multiple PS elements 410-440 may correspond to a designated angle. For example, if the PS 400 has a four-bit configuration, the first PS element 410 may correspond to 180°, and the second PS element 420 may correspond to 22.5°. In an embodiment, the multiple PS elements 410-440 may correspond to 180°, 22.5°, 45°, or 90° according to the signal flow direction, but this is only an example of implantation, and does not limit the scope of the disclosure. For example, the first PS element 410 may correspond to 25.5°, the second PS element 420 may correspond to 45°, the third PS element 430 may correspond to 90°, or the fourth PS element 440 may correspond to 180°.

According to various embodiments, the PS 400 may perform a function of changing the phase of a signal that has been input, and in the case of a four-bit configuration as illustrated in FIG. 4, may change the phase of 0-337.5° to a total of 16 phases at an interval of 22.59°. The phase changed by the PS 400 may correspond to the phase of the directional beam transmitted from the antenna element corresponding to the PS 400. Although not illustrated in FIG. 4, in the case of a five-bit configuration, the phase of 0-348.75° may be changed to a total of 32 phases at an interval of 11.25°.

According to various embodiments, the PS 400 may receive a command regarding activation of (or whether or not to apply) multiple PS elements 410-440 from the communication module 250 or the controller 330. In an embodiment, if the PS 400 has a four-bit configuration, the PS 400 may receive a command formed as a four-dimensional bit string. For example, the PS 400 may receive a command formed as a four-dimensional bit string of [0, 0, 1, 1]. The dimension of the bit string may correspond to the number of the multiple PS elements 410-440. As another example, if the PS 400 has a five-bit configuration, the PS 400 may receive a command formed as a five-dimensional bit string of [0, 1, 0, 1, 0].

According to various embodiments, the PS 400 may change the phase of a signal that has been input, by using at least one of the multiple PS elements 410-440, based on a command that has been input. For example, if the PS 400 has a four-bit configuration, and if the PS 400 has received a command formed as a four-dimensional bit string of [0,0, 1,1], the PS 400 may deactivate the first PS element 410 and the second PS element 420 and may activate the third PS element 430 and the fourth PS element 440, thereby changing the phase of the signal that has been input by 135° (45°+90°). As another example, if the PS 400 has a five-bit configuration, if the PS 400 includes a first PS element (not illustrated, 180°), a second PS element (not illustrated, 12.25°), a third PS element (not illustrated, 22.25°), a fourth PS element (not illustrated, 45°), and a fifth PS element (not illustrated, 90°), and if the PS 400 has received a command formed as a five-dimensional bit string of [0,1,0,1,0], the PS 400 may activate the second PS element (not illustrated) and the fourth PS element (not illustrated) only, thereby changing the phase of the signal that has been input by 57.25° (12.25°+45°).

TABLE 1

|  | First PS element 410 | Second PS element 420 | Third PS element 430 | Fourth PS element 440 |
| --- | --- | --- | --- | --- |
| 0° | 0 | 0 | 0 | 0 |
| 22.5° | 0 | 1 | 0 | 0 |
| 45 | 0 | 0 | 1 | 0 |
| 67.5° | 0 | 1 | 1 | 0 |
| 90 | 0 | 0 | 0 | 1 |
| 112.5° | 0 | 1 | 0 | 1 |
| 135° | 0 | 0 | 1 | 1 |
| 157.5° | 0 | 1 | 1 | 1 |
| 180° | 1 | 0 | 0 | 0 |
| 202.5° | 1 | 1 | 0 | 0 |
| 225° | 1 | 0 | 1 | 0 |
| 247.5° | 1 | 1 | 1 | 0 |
| 270° | 1 | 0 | 0 | 1 |
| 292.5° | 1 | 1 | 0 | 1 |
| 315° | 1 | 0 | 1 | 1 |
| 337.5° | 1 | 1 | 1 | 1 |

Table 1 enumerates four-dimensional bit strings corresponding 16 possible phases (0° to 337.5°).

As enumerated in Table 1, one of 16 phases divided at an interval of 22.5° from 0° to 337.5° may correspond to a specific four-dimensional bit string. For example, the phase of 67.5° may correspond to a four-dimensional bit string of [0,1,1,0], and the phase of 135° may correspond to a four-dimensional bit string of [0,0,1,1]. Accordingly, upon receiving a command formed as a four-dimensional bit string, the PS 400 may activate or deactivate multiple PS elements 410-444 according to the received command, thereby changing the phase of the signal that has been input.

In an embodiment, activation or deactivation of each of multiple PS elements 410-440 may be implemented in a switching type.

Figure 5A:
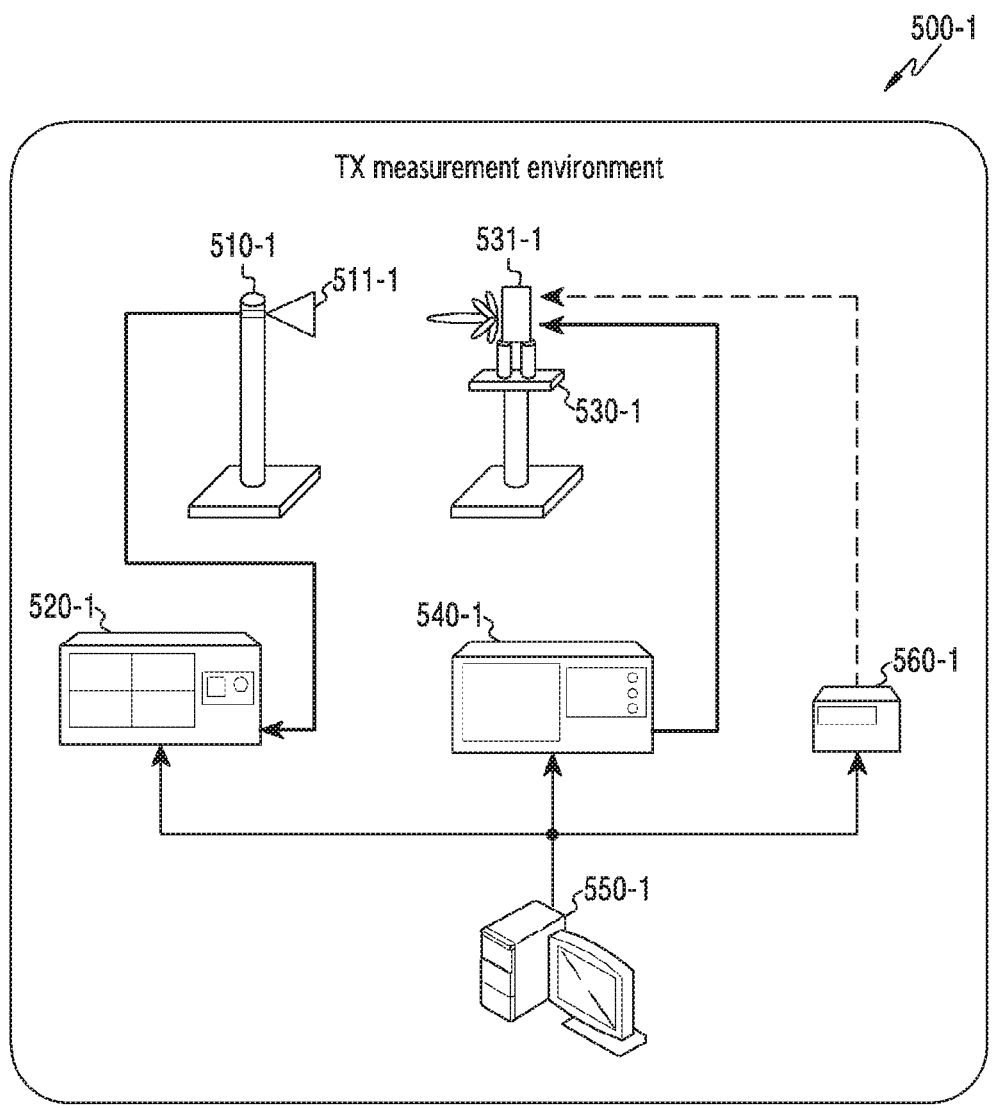
FIG. 5A is a diagram for describing a TX measurement environment for identifying characteristics related to the quality of a wireless communication device according to various embodiments of the disclosure.

FIG. 5A is a diagram for describing a TX measurement environment for identifying characteristics related to the quality of a wireless communication device according to various embodiments of the disclosure.

In an embodiment, the wireless communication device 531-1 may be the wireless communication device 260 in FIG. 2B.

In an embodiment, the TX measurement environment 500-1 for identifying characteristics of the wireless communication device 531-1 may include at least one of a PC 550-1, a signal generator 540-1, a signal analyzer 520-1, or a power supply 560-1.

According to various embodiments, the module-type wireless communication device 531-1 may be fixed to a first cradle 530-1. A signal detecting device 511-1 may be fixed to a second cradle 510-1. For example, the signal detecting device 511-1 may include a horn antenna. According to an embodiment, when the wireless communication device 531-1 is fixed to the first cradle 530-1, the signal detecting device 511-1 may be positioned to face the direction of a basic beam of the wireless communication device 531-1 (for example, when the phase of the PS 400 is 0°).

According to various embodiments, in the TX measurement environment 500-1, a control signal produced through the PC 550-1 may be transmitted to the signal generator 540-1, and the signal generator 540-1 may produce a corresponding RF signal or IF signal, based on the control signal transmitted from the PC 550-1. The RF signal or IF signal produced by the signal generator 540-1 may be provided to the wireless communication device 531-1 cradled on the first cradle 530-1. The wireless communication device 531-1 may include an array antenna (for example, first array antenna 280 or second array antenna 285) including multiple antenna elements, and may transmit an RF signal on the air (OTA) through the array antenna, by using the RF signal or IF signal provided from the signal generator 540-1.

According to various embodiments, the signal detecting device 511-1 fixed to the second cradle 510-1 may receive the RF signal transmitted from the wireless communication device 531-1, and the RF signal received by the signal detecting device 511-1 may be provided to the signal analyzer 520-1. The signal analyzer 520-1 may analyze the RF signal received through the signal detecting device 511-1, thereby testing or identifying whether or not the wireless communication device 531-1 operates normally. For example, the signal analyzer 520-1 may calculate the signal strength (for example, equivalent isotropic radiated power (EIRP)) of the received RF signal, and may determine the power of the RF signal based on the calculated signal strength. In an embodiment, the unit of the EIRP may be dBm.

The signal analyzer 520-1 or the PC 550-1 may identify the characteristics of the wireless communication device 531-1, based on the power of the RF signal. In an embodiment, the signal analyzer 520-1 or the PC 550-1 may identify characteristics related to the quality of the wireless communication device 531-1. For example, the signal analyzer 520-1 or the PC 550-1 may confirm that the wireless communication device 531-1 is unacceptable or acceptable.

Figure 5B:
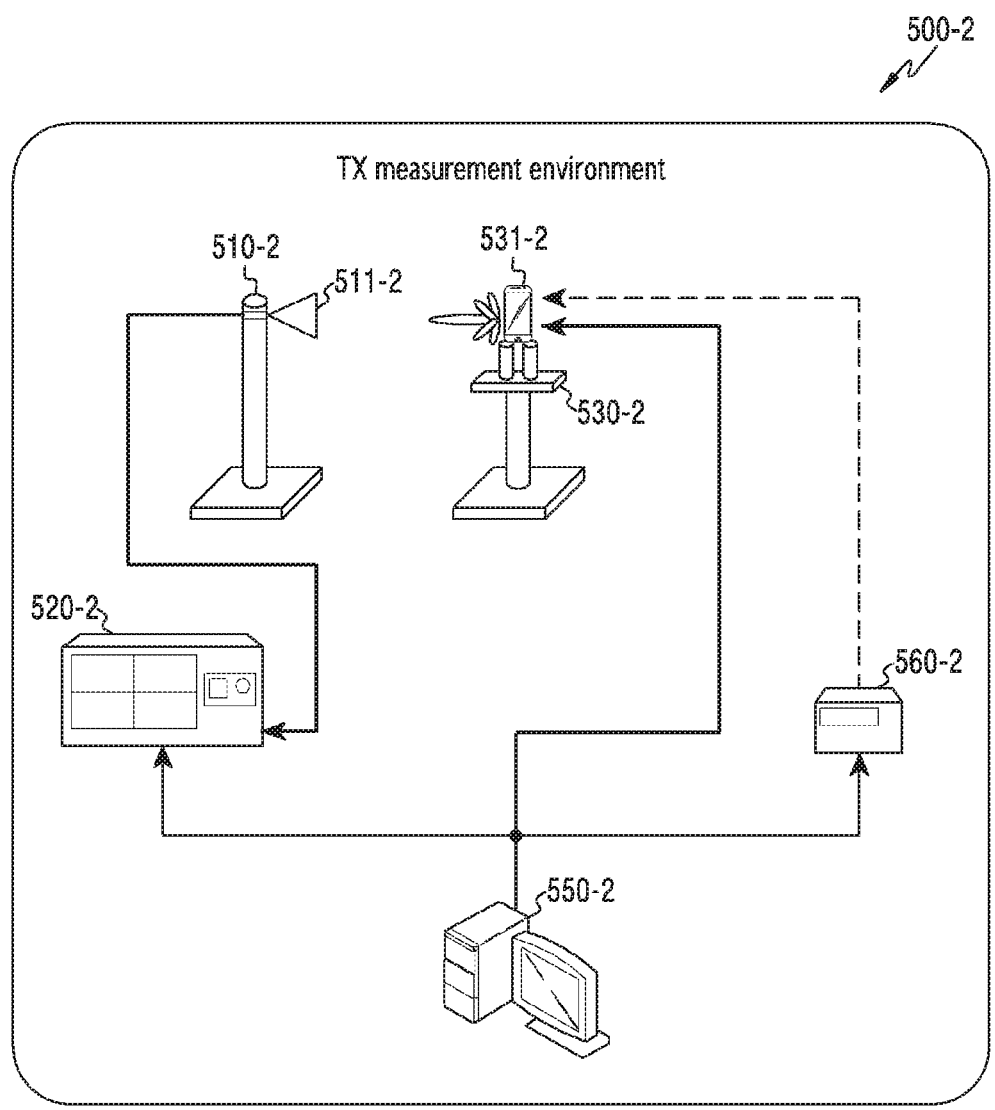
FIG. 5B is a diagram for describing a TX measurement environment for identifying characteristics related to the quality of an electronic device according to various embodiments of the disclosure.

FIG. 5B is a diagram for describing a TX measurement environment for identifying characteristics related to the quality of a wireless communication device according to various embodiments of the disclosure.

In an embodiment, the electronic device 531-2 may be the electronic device 200 in FIG. 2A.

According to an embodiment, the TX measurement environment 500-2 for identifying characteristics related to the quality of the wireless communication device (for example, wireless communication device 260 in FIG. 2B) included in the electronic device 531-1 may include at least one of a PC 550-2, a signal analyzer 520-2, or a power supply 560-2.

In the TX measurement environment 500-2, the signal detecting device 511-2, the second cradle 510-2, and the signal analyzer 520-2 have similar or identical roles as those of the signal detecting device 511-1, the second cradle 510-1, and the signal analyzer 520-1 in the TX measurement environment 500-1, and detailed descriptions thereof will be omitted herein.

According to various embodiments, in the TX measurement environment 500-2, a control signal produced through the PC 550-2 may be transmitted to the electronic device 531-2, and the electronic device 531-2 may produce an RF signal or an IF signal based on the control signal transmitted from the PC 550-2 and may transmit an RF signal on the air by using the produced signal. For example, the electronic device 531-2 may receive a control signal from the PC 550-2, not from the signal generator 540-1.

Figure 5C:
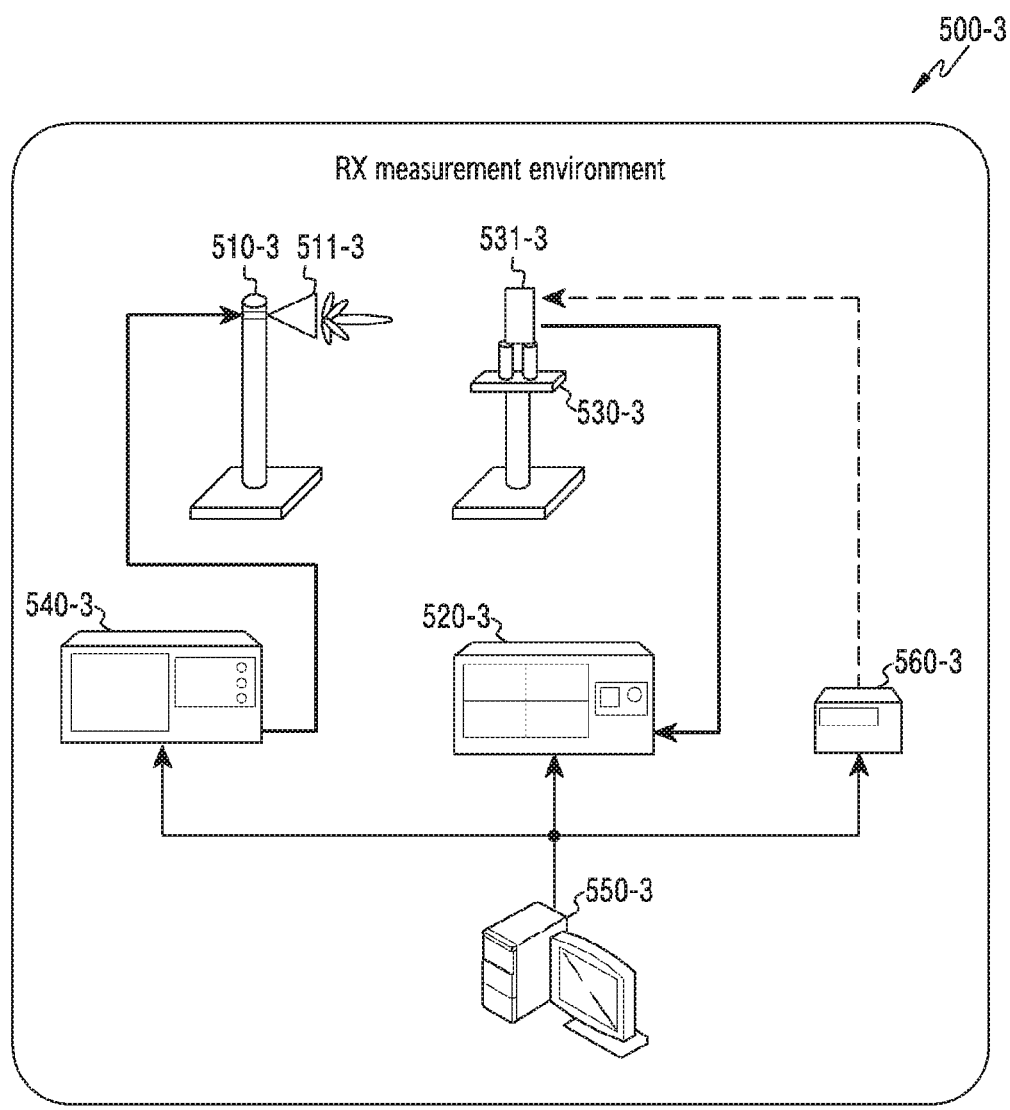
FIG. 5C is a diagram for describing a RX measurement environment for identifying characteristics related to the quality of a wireless communication device according to various embodiments of the disclosure.

FIG. 5C is a diagram for describing a RX measurement environment for identifying characteristics related to the quality of a wireless communication device according to various embodiments of the disclosure.

In an embodiment, the wireless communication device 531-3 may be the wireless communication device 260 in FIG. 2B.

According to an embodiment, the TX measurement environment 500-3 for identifying characteristics of the wireless communication device 531-3 may include at least one of a PC 550-3, a signal generator 540-3, a signal analyzer 520-3, or a power supply 560-3.

According to various embodiments, the modular-type wireless communication device 531-3 may be fixed to a first cradle 530-3. A signal transmission device 511-3 may be fixed to a second cradle 510-3. According to an embodiment, the signal transmission device 511-3 may include an array antenna (not illustrated), and may form a beam facing a designated direction by using the array antenna. According to an embodiment, when the wireless communication device 531-3 is fixed to the first cradle 530-3, the signal transmission device 511-3 may be positioned to face the direction of the beam formed by the signal transmission device 511-3.

According to various embodiments, in the TX measurement environment 500-3, a control signal produced through the PC 550-3 may be transmitted to the signal generator 540-3, and the signal generator 540-3 may produce a corresponding RF signal or IF signal, based on the control signal transmitted from the PC 550-3. The RF signal or IF signal produced by the signal generator 540-3 may be provided to the signal transmission device 511-3 cradled on the second cradle 510-3. The signal transmission device 511-3 may transmit an RF signal on the air through the array antenna, by using the RF signal or IF signal provided from the signal generator 540-3.

According to various embodiments, the wireless communication device 531-3 fixed to the first cradle 530-3 may receive the RF signal transmitted from the signal transmission device 511-3. The received RF signal may be provided to the signal analyzer 520-3. The signal analyzer 520-3 may analyze the RF signal received through the wireless communication device 531-3, thereby testing or identifying whether or not the wireless communication device 531-3 operates normally. For example, the signal analyzer 520-3 may calculate the signal strength (for example, received signal strength indicator (RSSI)) of the received RF signal, and may determine the power of the RF signal based on the calculated signal strength. In an embodiment, the unit of the RSSI may be dB or dBm.

The signal analyzer 520-3 or the PC 550-3 may identify the characteristics of the wireless communication device 531-3, based on the power of the RF signal. In an embodiment, the signal analyzer 520-3 or the PC 550-3 may identify characteristics related to the quality of the wireless communication device 531-3. For example, the signal analyzer 520-3 or the PC 550-3 may confirm that the wireless communication device 531-3 is unacceptable or acceptable.

Figure 5D:
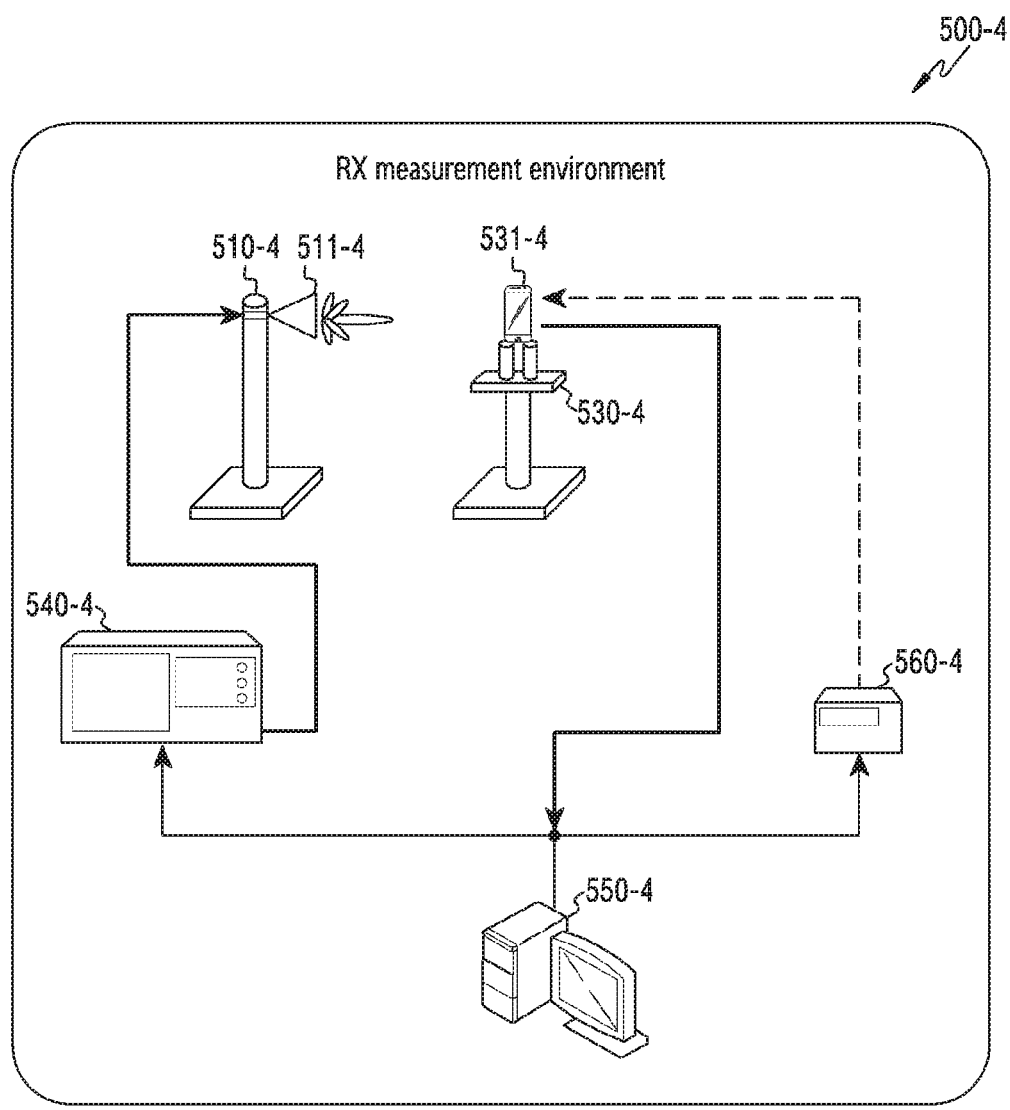
FIG. 5D is a diagram for describing a RX measurement environment for identifying characteristics related to the quality of an electronic device according to various embodiments of the disclosure.

FIG. 5D is a diagram for describing a RX measurement environment for identifying characteristics related to the quality of a wireless communication device included in an electronic device according to various embodiments of the disclosure.

In an embodiment, the electronic device 531-4 may be the electronic device 200 in FIG. 2A.

According to an embodiment, the TX measurement environment 500-4 for identifying characteristics related to the quality of the wireless communication device (for example, wireless communication device 260 in FIG. 2B) included in the electronic device 531-4 may include at least one of a PC 550-4, a signal generator 540-4, or a power supply 560-4.

In the TX measurement environment 500-4, the signal transmission device 511-4, the second cradle 510-4, and the signal generator 540-4 have similar or identical roles as those of the signal transmission device 511-3, the second cradle 510-3, and the signal generator 540-3 in the TX measurement environment 500-3, and detailed descriptions thereof will be omitted herein.

According to various embodiments, the electronic device 531-4 may be fixed to the first cradle 530-4.

According to various embodiments, the electronic device 531-4 fixed to the first cradle 530-4 may receive an RF signal transmitted from the signal transmission device 511-4 and may analyze the received RF signal. For example, the electronic device 531-4 may not provide the received RF signal to the signal analyzer 520-3. The electronic device 531-4 may analyze the received RF signal, thereby identifying characteristics related to the quality of the electronic device 531-4 (for example, whether or not the same is unacceptable or acceptable). For example, the electronic device 531-4 may calculate the signal strength (for example, RSSI) of the received RF signal, may determine the power of the RF signal based on the calculated signal strength, and may identify characteristics related to the quality of the electronic device 531-4 based on the determined power of the RF signal.

According to various embodiments, after receiving data related to the signal power of the RF signal from the electronic device 531-4, the PC 550-4 may identify characteristics related to the quality of the wireless communication device included in the electronic device 531-4.

Figure 6:
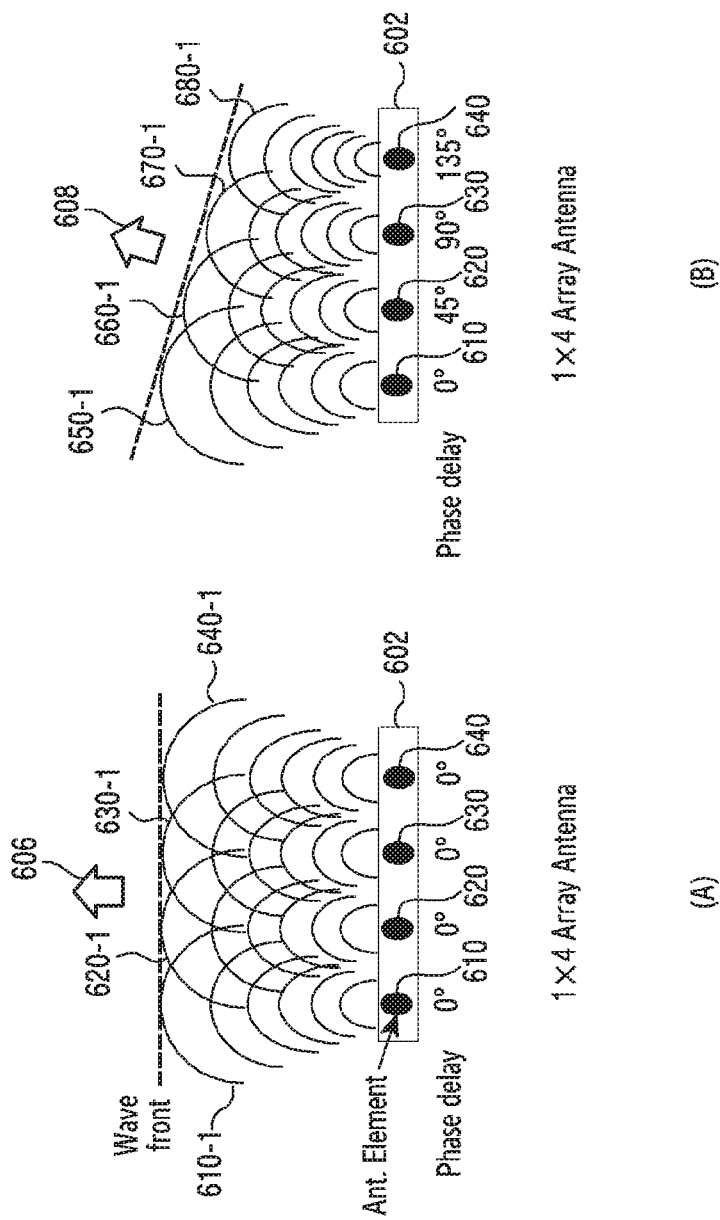
FIG. 6 is a diagram for describing the relation between the direction of a beam formed by an array antenna and multiple PSs, according to various embodiments of the disclosure.

FIG. 6 is a diagram for describing the relation between the direction of a beam formed by an array antenna and multiple PSs, according to various embodiments of the disclosure.

FIG. 6A and FIG. 6B illustrate beams in different directions, formed by an array antenna 602 included in a wireless communication device (for example, wireless communication device 260 in FIG. 2B). In an embodiment, the array antenna 602 may include multiple antenna elements. For example, the array antenna 602 may include at least some of antenna elements included in the first array antenna 280 or at least some of antenna elements included in the second array antenna 285. In an embodiment, the array antenna 602 may include multiple (for example, four) antenna elements (for example, first antenna element 610 to fourth antenna element 640), and may be formed in a 1×4 matrix type.

In an embodiment, the antenna elements included in the array antenna 602 may be connected to TX/RX signal processing sub-circuits (for example, multiple TX/RX signal processing sub-circuits 310-1 to 310-16 in FIG. 3). For example, the first antenna element 610 may be connected to the first TX/RX signal processing sub-circuit 310-1. As another example, the second antenna element 620 may be connected to the second TX/RX signal processing sub-circuit 310-2.

In an embodiment, the antenna elements may transmit/receive a signal, the phase of which is changed by a TX PS included in TX/RX signal processing sub-circuits connected thereto. For example, the first antenna element 610 may transmit/receive a signal, the phase of which is changed by the first TX PS 314-1 included in the first TX/RX signal processing sub-circuit 310-1.

Referring to FIG. 6A, the antenna elements 610-640 forming the array antenna 602 may transmit a first directional signal 610-1 to a fourth directional signal 640-1 corresponding to the same phase delay. In an embodiment, the antenna elements 610-640 forming the array antenna 602 may transmit a first directional signal 610-1 to a fourth directional signal 640-1 corresponding to phase delay of 0°. For example, the first TX PS 314-1 included in the first TX/RX signal processing sub-circuit 310-1 connected to the first antenna element 610 may output an input signal without changing the phase thereof, and the first antenna element 610 may transmit/receive a first directional signal 610-1 having the same phase as the input signal that is input to the first TX PS 314-1. As another example, the second antenna element 620 may transmit/receive a second directional signal 620-1 having the same phase as the input signal that is input to the second TX PS 314-2.

Referring to FIG. 6B, the antenna elements 610-640 forming the array antenna 602 may transmit a fifth directional signal 650-1 to an eighth direction signal 680-1 corresponding to the phase delay of the antenna elements 610-640. In an embodiment, the antenna elements 610-640 forming the array antenna 602 may transmit directional signals having different phase delays at the same interval (for example, 450). For example, the first antenna element 610 may transmit a fifth directional signal 650-1 corresponding to a phase delay of 0°, the second antenna element 620 may transmit a sixth directional signal 660-1 corresponding to a phase delay of 45°, and the third antenna element 630 may transmit a seventh directional signal 670-1 corresponding to a phase delay of 90°.

In an embodiment, the wireless communication device 260 may form directional beams 606 and 608 in a specific (or desired) direction, by using the first antenna element 610, the second antenna element 620, the third antenna element 630, or the fourth antenna element 650, which forms the array antenna 602. For example, referring to FIG. 6A, the wireless communication device 260 may form a directional beam 606 facing in a first direction, by using a first directional signal 610-1 to a fourth directional signal 640-1, which are transmitted by fourth antenna elements 610-640 forming the array antenna 602, and which correspond to the same phase delay. As another example, referring to FIG. 6B, the wireless communication device 260 may form a directional beam 608 facing in a second direction, by using a fifth directional signal 650-1 to an eighth directional signal 680-1, which are transmitted by fourth antenna elements 610-640 forming the array antenna 602, and which correspond to different phase delays, respectively.

According to an embodiment, the wireless communication device 260 may adjust (change or maintain) the phase of a signal transmitted from the antenna elements 610-640 forming the array antenna 602, thereby forming a beam in a desired direction, or steering the beam.

Figure 7:
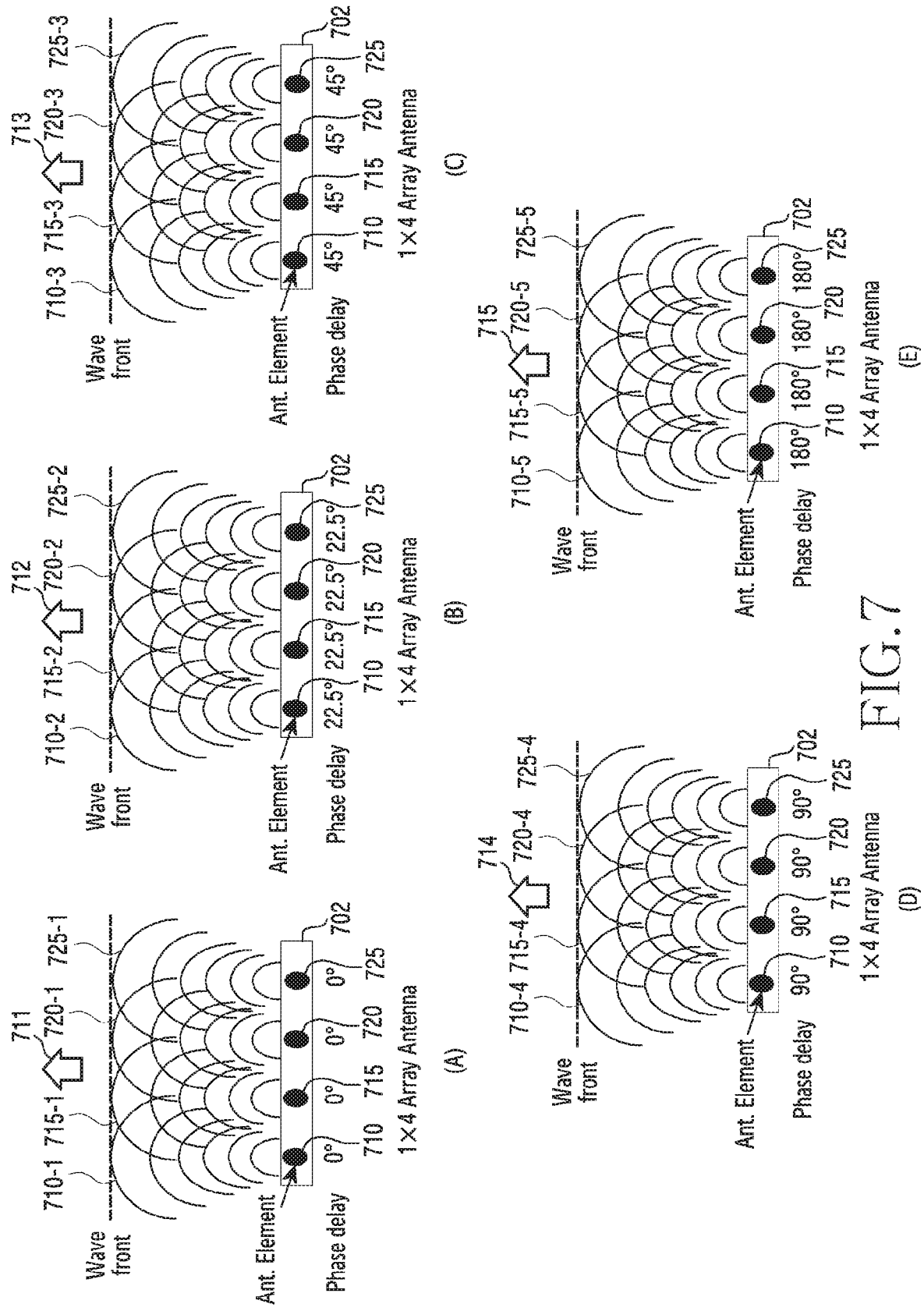
FIG. 7 is a diagram for describing an operation of forming multiple beams necessary to identify whether or not a wireless communication device operates normally, according to various embodiments of the disclosure.

FIG. 7 is a diagram for describing an operation of forming multiple beams necessary to identify whether or not a wireless communication device operates normally, according to various embodiments of the disclosure.

Referring to FIG. 7A to FIG. 7E, the wireless communication device (for example, wireless communication device 260 in FIG. 2B) may include an array antenna 702 (for example, first array antenna 280 or second array antenna 285).

In an embodiment, the array antenna 702 may include two or more antenna elements. Referring to FIG. 7A to FIG. 7E, the array antenna 702 may include a first antenna element 710 to a fourth antenna element 725.

In an embodiment, the array antenna 702 may form a beam formed in a specific direction by using two or more antenna elements included in the array antenna 702. For example, the array antenna 702 may form a beam (for example, beam 711) facing in a first direction, by using a first antenna element 710 to a fourth antenna element 725.

In an embodiment, the first antenna element 710 to the fourth antenna element 725 included in the array antenna 702 may form directional signals corresponding to a phase delay of a designated angle. In an embodiment, the phase delay may be an angle configured for a TX PS of a TX/RX signal processing sub-circuit connected to an antenna element. For example, if 0° is configured for the first TX PS 314-1 of the first TX/RX signal processing sub-circuit 310-1 connected to the first antenna element 710, the first antenna element 710 may transmit a directional signal having the same phase as the input signal that is input to the first TX PS 314-1. As another example, if 22.5° is configured for the second TX PS 314-2 of the second TX/RX signal processing sub-circuit 310-2 connected to the second antenna element 715, the second antenna element 715 may transmit a directional signal having a phase lagging by 22.5° than the input signal that is input to the second TX PS 314-2.

In an embodiment, the antenna elements 710-725 included in the array antenna 702 may transmit directional signals (for example, 710-1 to 725-1, 710-2 to 725-2, 730-1 to 725-3, 710-4 to 725-4, 710-5 to 725-5) corresponding to a phase delay of the same angle.

Referring to FIG. 7A to FIG. 7E, the antenna elements 710-725 included in the array antenna 702 may transmit directional signals corresponding to phase delays of 0°, 22.5°, 45°, 90°, and 180°. For example, referring to FIG. 7A, all antenna elements 710-725 transmit first directional signals 710-1 to 725-1 corresponding to a phase delay of 0°; referring to FIG. 7B, all antenna elements 710-725 transmit second directional signals 710-2 to 725-2 corresponding to a phase delay of 22.5°; referring to FIG. 7C, all antenna elements 710-725 transmit third directional signals 710-3 to 725-3 corresponding to a phase delay of 45°; referring to FIG. 7D, all antenna elements 710-725 transmit fourth directional signals 710-4 to 725-4 corresponding to a phase delay of 90°; and referring to FIG. 7E, all antenna elements 710-725 transmit fifth directional signals 710-5 to 725-5 corresponding to a phase delay of 180°.

In an embodiment, the wireless communication device 260 may control the antenna elements 710-725 included in the array antenna 702 so as to transmit directional signals corresponding to a phase delay of the same angle, thereby forming a beam facing in the same direction (for example, first direction). Referring to FIG. 7A, the wireless communication device 260 may control all antenna elements 710-725 included in the array antenna 702 so as to transmit first directional signals 710-1 to 725-1 corresponding to a phase delay of 0°, thereby forming a first beam 711 facing in the first direction. Referring to FIG. 7B, the wireless communication device 260 may control all antenna elements 710-725 included in the array antenna 702 so as to transmit second directional signals 710-2 to 725-2 corresponding to a phase delay of 22.5°, thereby forming a second beam 712 facing in the first direction. Referring to FIG. 7C to FIG. 7E, the wireless communication device 260 may control all antenna elements 710-725 included in the array antenna 702 so as to transmit third directional signals 710-3 to 725-3 to fifth directional signals 710-5 to 725-5 corresponding to a phase delay of the same angle (for example, 45°, 90°, 180°), thereby forming a third beam 713 to a fifth beam 715 facing in the first direction.

Referring to FIG. 7A to FIG. 7E, it may be identified that, if all antenna elements included in the array antenna 702 transmit directional signals corresponding to a phase delay of the same angle, the direction of the beam formed by the wireless communication device 260 is irrelevant to the phase delay value. For example, referring to FIG. 7A, if all antenna elements 710-725 included in the array antenna 702 transmit first directional signals 710-1 to 725-1 corresponding to a phase delay of 0°, a first beam 711 may be formed in the first direction. Referring to FIG. 7A, if all antenna elements 710-725 included in the array antenna 702 transmit second directional signals 710-2 to 725-2 corresponding to a phase delay of 22.5°, a second beam 712 may be formed in the first direction as well.

Referring to FIG. 7C to FIG. 7E, if all antenna elements 710-725 included in the array antenna 702 transmit third directional signals 710-3 to 725-3 to fifth directional signals 710-5 to 725-5 corresponding to the same phase delay (for example, 45°, 90°, 180°), a third beam 713 to a fifth beam 715 may be formed in the first direction.

The fact that the direction (for example, first direction) of the beam (for example, first beam 711) formed when all antenna elements (for example, first antenna element 710 to fourth antenna element 725) transmit directional signals (for example, first directional signals 710-1 to 725-1) corresponding to the same phase delay (for example, 0°) is identical means that, in connection with identifying whether or not the wireless communication device 260 operates normally, there is no need to change the position of the signal detecting device (for example, signal detecting device 511-1 in FIG. 5A) each time. For example, if TX PSs (for example, first TX PS 314-1 to fourth TX PS 314-4) corresponding to all antenna elements 710-725 are controlled such that all antenna elements 710-725 transmit directional signals corresponding to the same phase delay, and if the value of the phase delay is changed according to a designated setting, it is possible to identify whether or not the wireless communication device operates normally only with a simple configuration and with a minimum number through a minimum number of inspections (for example, five times) only.

Figure 8:
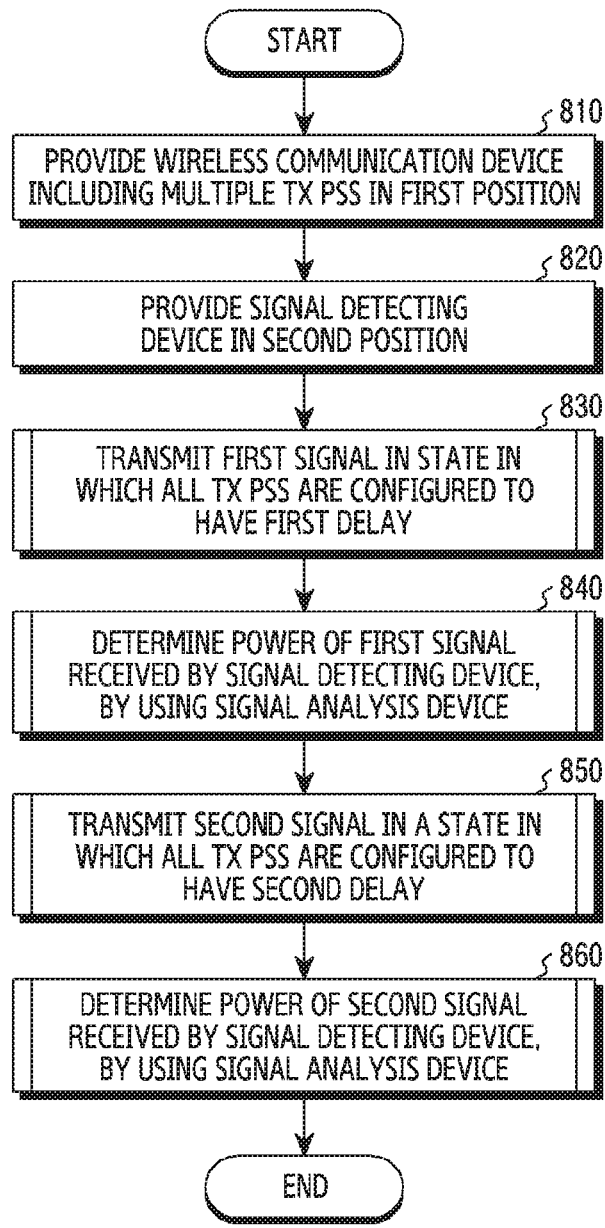
FIG. 8 is a flowchart for identifying whether or not a wireless communication device operates normally, according to various embodiments of the disclosure.

FIG. 8 is a flowchart for identifying whether or not a wireless communication device operates normally, according to various embodiments of the disclosure.

In an embodiment, the wireless communication device may be the wireless communication device 260 in FIG. 2.

In operation 810, a wireless communication device 260 including multiple TX PSs may be provided in a first position.

In an embodiment, the first position may be the position of a first cradle 530-1 in a TX measurement environment (for example, TX measurement environment 500-1 in FIG. 5A).

In an embodiment, the wireless communication device 260 may include multiple (for example, 16) TX/RX signal processing sub-circuits, and at least some of the TX/RX signal processing sub-circuits may be activated according to a designated direction or a pattern of a beam to be made. The number of at least some activated TX/RX signal processing sub-circuits may be N.

For example, if N=16, the wireless communication device 260 may include a first TX/RX signal processing sub-circuit 310-1 to a 16$^{th}$ TX/RX signal processing sub-circuit 310-16. It will be assumed in the following description that N=16.

In an embodiment, the TX/RX signal processing sub-circuits 310-1 to 310-16 may include TX PSs 314-1 to 314-16 in a TX path. For example, the first TX/RX signal processing sub-circuit 310-1 may include a first TX PS 314-1. In an embodiment, a TX PS may include multiple PS elements, and the number of PS elements may be determined according to the bit configuration of the TX PS. For example, if the first TX PS 314-1 has a four-bit configuration, the first TX PS 314-1 may include a first PS element 410 to a fourth PS element 440.

In operation 820, a signal detecting device (for example, signal detecting device 511-1) may be provided in a second position. In an embodiment, the second position may be the position of a second cradle 510-1 in the TX measurement environment 500-1. In an embodiment, the signal detecting device (for example, 511-1) may include a horn antenna.

In operation 830, in a state in which multiple TX PSs 314-1 to 314-16 are all configured to have a first delay (for example, 0°), the wireless communication device 260 may be caused to transmit a first signal.

In an embodiment, the wireless communication device 260 provided in the first position may transmit a first signal, based on at least one of a signal that is input from an external device (for example, signal generator 540-1 in FIG. 5A), a command input therefrom, or an instruction stored in the memory of the wireless communication device 260. For example, the first signal may be a beam (for example, first beam 711 in FIG. 7) formed in a specific direction.

In an embodiment, the first delay may be 0°. For example, a first signal may be transmitted in a state in which multiple TX PSs are all configured to have a delay of 0°. For example, a first signal may be transmitted in a state in which the first TX PS 314-1 of the TX/RX signal processing sub-circuit 310-1 to the 16$^{th}$ TX PS 314-16 of the 16$^{th}$ TX/RX signal processing sub-circuit 310-16 are configured to have a delay of 0°.

In operation 840, power of the first signal may be determined or identified by using the signal detecting device 511-1. In an embodiment, power of the first signal received through the signal detecting device 511-1 may be determined or identified by the signal analysis device 520-1. In an embodiment, power of the first signal may be determined, based on the signal strength (for example, equivalent isotropic radiated power (EIRP)) of the first signal received through the signal detecting device 511-1.

In operation 850, in a state in which multiple TX PSs 314-1 to 314-16 are all configured to have a second delay, the wireless communication device 260 may be caused to transmit a second signal. In an embodiment, the second signal may be a beam (for example, second beam 712 in FIG. 7) formed in a specific direction. In an embodiment, the direction of the second signal may be identical to the direction of the first signal.

In an embodiment, the second delay may have a value different from that of the first delay. In an embodiment, if the multiple TX PSs 314-1 to 314-16 have a four-bit configuration, the difference between the second delay and the first delay may be 22.5°*n (n is an integer). In an embodiment, n may be one of 1, 2, 4, and 8. For example, the first delay may be 0°, and the second delay may be 22.5° (n=1). As another example, the first delay may be 0°, and the second delay may be 45° (n=2).

In an embodiment, operation 850 may include multiple operations. For example, if the first delay is 0°, the second delay may be one of 22.5°, 45°, 90°, and 180, and operations 850 and 860 may be repeated multiple times (for example, maximum of four times) while changing the value of the second delay. Details thereof will be described later with reference to FIG. 10.

In operation 860, power of the second signal may be determined or identified by using the signal detecting device 511-1. In an embodiment, power of the second signal received through the signal detecting device 511-1 may be determined or identified by a signal analysis device 520-1. In an embodiment, power of the second signal may be determined, based on the signal strength (for example, equivalent isotropic radiated power (EIRP)) of the first signal received through the signal detecting device 511-1.

Although not illustrated, whether or not the wireless communication device 260 operates normally may be identified based on power of the first signal and power of the second signal. For example, if power of the first signal does not belong to a first section, it may be identified that the wireless communication device 260 is abnormal (or unacceptable) or includes an unacceptable element. As another example, if power of the first signal belongs to a first section, and if power of the second signal belongs to a second section, it may be identified that the wireless communication device 260 is normal (or acceptable) or includes no unacceptable element.

Figure 9:
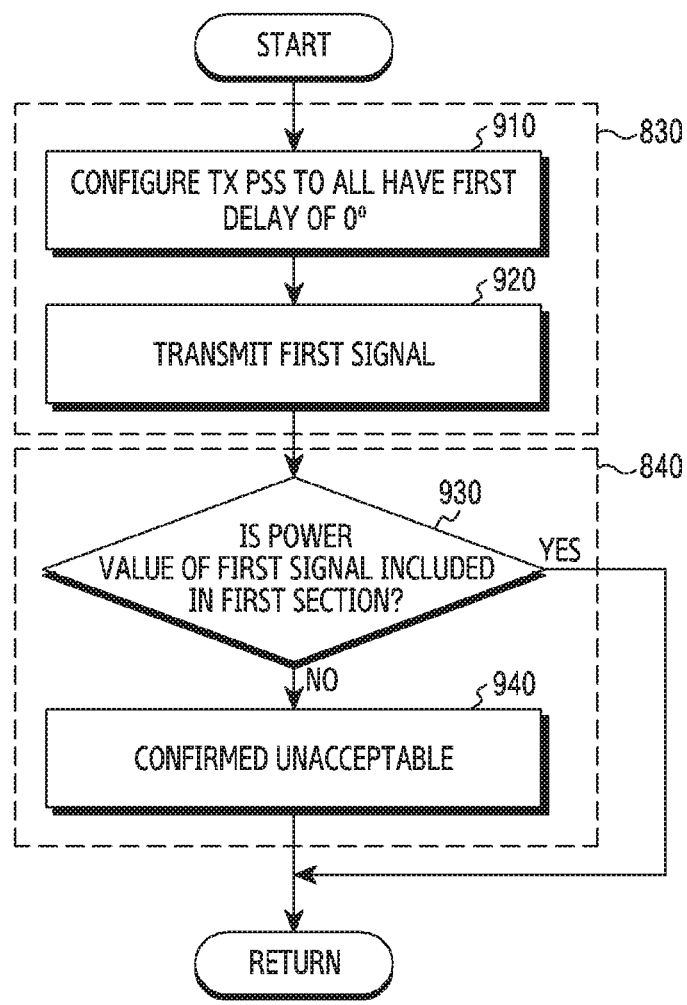
FIG. 9 is a flowchart for identifying whether or not a wireless communication device operates normally, according to various embodiments of the disclosure.

FIG. 9 is a flowchart for identifying whether or not a wireless communication device according to various embodiments of the disclosure operates normally.

In an embodiment, the wireless communication device may be the wireless communication device 260 in FIG. 2.

In an embodiment, FIG. 9 may be a detailed flowchart of operations 830 and 840 in FIG. 8.

In operation 910, multiple TX PSs 314-1 to 314-16 may all be configured to have a first delay of 0°. For example, the first TX PS 314-1 of the first TX/RX signal processing sub-circuit 310-1 to the 16$^{th}$ TX PS 314-16 of the 16$^{th}$ TX/RX signal processing sub-circuit 310-16 may be configured to have a first delay of 0°. For example, the first PS element 410 to the fourth PS element 440 of the first TX PS 314-1 may all be deactivated.

In operation 920, the wireless communication device 260 may be caused to transmit a first signal. For example, in a state in which the first TX PS 314-1 to the 16$^{th}$ TX PS 314-16 are configured to have a first delay of 0°, the wireless communication device 260 may transmit a first signal.

In operation 930, it may be identified whether or not power of the first signal is included in a first section. In an embodiment, it may be identified whether or not power of a first signal detected by a signal analyzer 520-1 is included in a first section. In an embodiment, the first section may be a section designated to recognize the initial unacceptability of the wireless communication device 260. The upper limit (Pmax) and the lower limit (Pmin) of the first section may be designated regardless of the power of the first signal.

For example, if it is identified that power of the first signal is included in the first section, it is possible to proceed to operation 850 in FIG. B. The description that power of the first signal is included in the first section may mean that, among components included in the TX path of multiple TX/RX signal processing sub-circuits 310-1 to 310-16, remaining components (for example, multiple PAs 316-1 to 316-16, multiple PPAs 315-1 to 315-16, multiple PSDAs 313-1 to 313-16, and the like) other than multiple TX PSs 314-1 to 314-16, or antenna elements included in a first array antenna 280 or a second array antenna 285, are not abnormal. For example, the first signal has been transmitted in a state in which multiple TX PSs 314-1 to 314-16 are all configured to have a first delay of 0°, and multiple PS elements 410-440 forming respective TX PSs need to be all deactivated in order for the multiple TX PSs 314-1 to 314-16 to be all configured to have a first delay of 0°.

If it is identified that power of the first signal is not included in the first section, it is possible to proceed to operation 940. In operation 940, the wireless communication device 260 may be deemed to be unacceptable. In an embodiment, it may be identified that components included in the TX path of multiple TX/RX signal processing sub-circuits 310-1 to 310-16 (for example, multiple TX PSs 314-1 to 314-16, multiple PAs 316-1 to 316-16, multiple PPAs 315-1 to 315-16, multiple PSDAs 313-1 to 313-16, and the like) or antenna elements included in the first array antenna 280 or the second array antenna 285 include unacceptable elements.

In an embodiment, at least one of identification information of the wireless communication device 260, power of the first signal, time or place at which the unacceptability is identified, may be recorded in the memory of the wireless communication device 260 or in the memory of an external device (for example, PC 550-1 in FIG. 5A).

Figure 10:
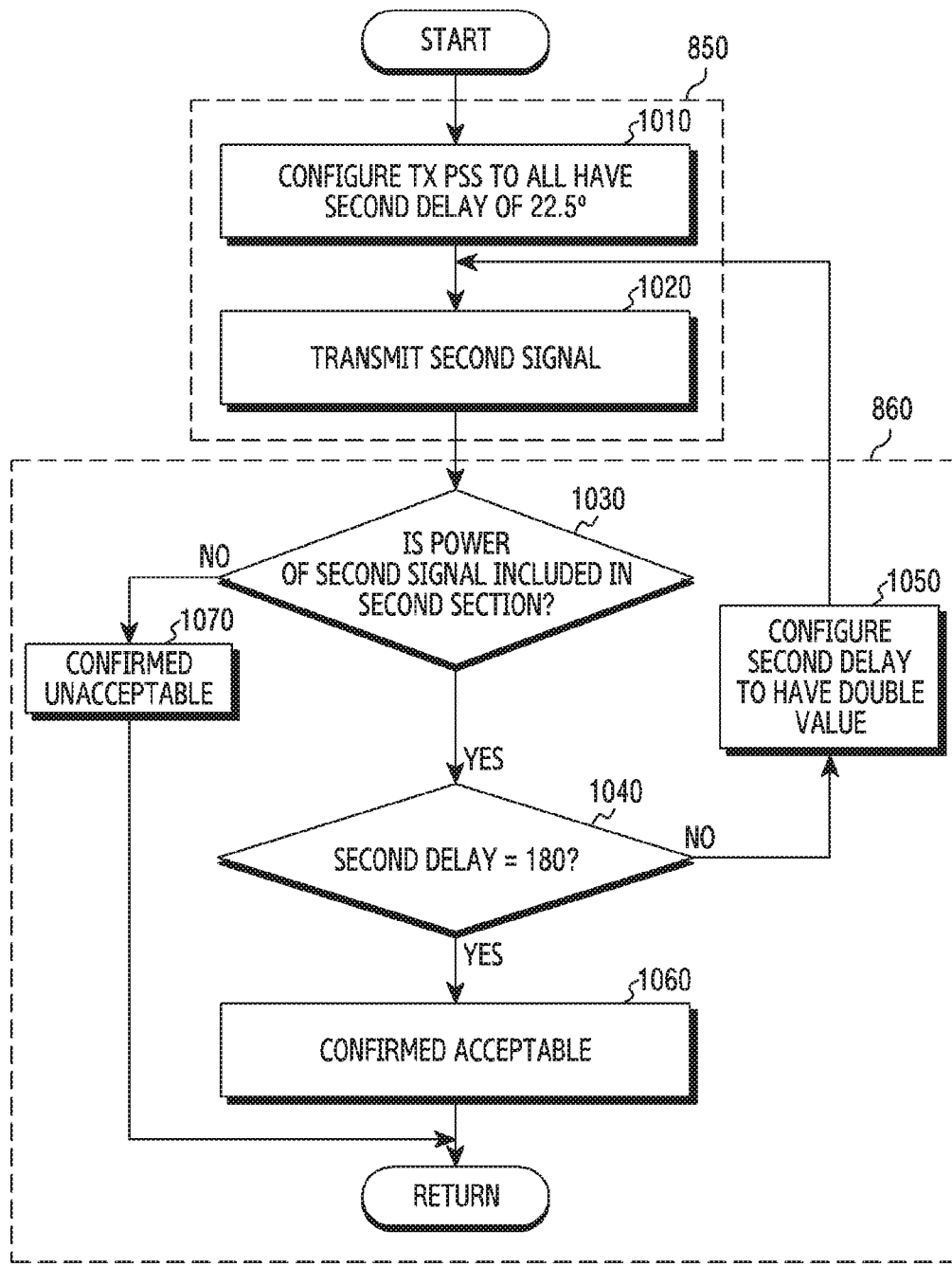
FIG. 10 is a flowchart for identifying whether or not a wireless communication device operates normally, according to various embodiments of the disclosure.

FIG. 10 is a flowchart for identifying whether or not a wireless communication device according to various embodiments of the disclosure operates normally.

In an embodiment, the wireless communication device may be the wireless communication device 260 in FIG. 2.

In an embodiment, FIG. 10 may be a detailed flowchart of operations 850 and 860 in FIG. 8.

In an embodiment, multiple TX PSs 314-1 to 314-16 may be formed by four bits.

In operation 1010, multiple TX PSs 314-1 to 314-16 may all be configured to have a second delay of 22.59°. For example, if the multiple TX PSs 314-1 to 314-16 have a four-bit configuration, the first TX PS 314-1 of the first TX/RX signal processing sub-circuit 310-1 to the 16$^{th}$, TX PS 314-16 of the 16$^{th}$, TX/RX signal processing sub-circuit 310-16 may be configured to have a second delay of 22.59°. For example, among multiple PS elements 410-440 included in the first TX PS 314-1, the second PS element 420 may be activated, and the first, third, and fourth PS elements 410, 430, and 440 may be deactivated.

If the power value of the transmitted first signal is included in the first section in a state in which multiple TX PSs 314-1 to 314-16 are all configured to have a first delay of 0°, the multiple TX PSs 314-1 to 314-16 are all configured to have a second delay of 22.5°. This is because 22.5° is the reference angle in connection with the four-bit configuration. The reference angle may be obtained by dividing 360° by 2 to the power of the bit number, for example. If the second delay is changed by the number of angles larger than 0, which can be designated for multiple PS elements 410-

440, and if power of the second signal is included in a designated section in each case, then it may be confirmed that the wireless communication device 260 is normal. In an embodiment, the second delay may be changed in the order of 22.5°→45°→90°→180°. As another example, the second delay may be changed in the order of 180°→90°→45°→22.5°, or in a different order.

In operation 1029, the wireless communication device 260 may be caused to transmit a second signal. For example, the wireless communication device 260 may transmit a second signal in a state in which multiple TX PSs 314-1 to 314-16 are configured to have a second delay of 22.5°.

In operation 1030, it may be identified whether or not power of the second signal is included in a second section. In an embodiment, it may be determined whether or not power of a second signal, determined based on the signal strength of the second signal received through a signal detecting device (for example, signal detecting device 511-1 in FIG. 5A), is included in the second section. In an embodiment, the second section may be irrelevant to power of the second signal. The second section may be determined according to power of the first signal. For example, the upper limit of the second section may be obtained by adding the power of the first signal and a reference value, and the lower limit of the second section may be obtained by subtracting the reference value from the power of the first signal.

In operation 1030, if it is identified that power of the second signal is included in the second section, it may be identified in operation 1040 whether or not the second delay is 180°.

In operation 1040, if the second delay is not 180°, the second delay is configured to be double the existing value in operation 1050. For example, if the second delay has been configured to be 22.5°, the second delay may be configured to be 45° in operation 1050.

For example, one or more operations (for example, operations 1020 to 1050) may be repeatedly performed until the second delay having 22.5° as the initial value becomes 180°. The number of repetitions of operations 1020 to 1040 may be a maximum of four (for example, 22.5°, 45°, 90°, 180°), and the number of repetitions of operation 1050 may be a maximum of three. The number of repetitions may be changed according to the bit configuration of the multiple TX PSs.

In operation 1030, if it is confirmed that the power of the second signal is not included in the second section, the wireless communication device 260 may be deemed unacceptable in operation 1070. In an embodiment, at least one of identification information of the wireless communication device 260, power of the second signal, the second delay value, time or place at which the unacceptable element is identified, may be recorded in the memory of the wireless communication device 260 or in the memory of an external device (for example, PC 550-1 in FIG. 5A).

For example, if the second delay is 45°, and if it is confirmed that the power of the second signal is not included in the second section, it may be confirmed that the third PS element 430 of a TX PS included in at least one of the multiple TX/RX signal processing sub-circuits 310-1 to 310-16 included in the wireless communication device 260 is unacceptable. This is because only the third PS element 430 is activated, among the fourth PS elements 410-440, in order for the second delay to be configured to be 45°.

As another example, if the second delay is 90°, and if it is confirmed that the power of the second signal is not included in the second section, it may be confirmed that the fourth PS element 440 of a TX PS included in at least one of the multiple TX/RX signal processing sub-circuits 310-1 to 310-16 included in the wireless communication device 260 is unacceptable. This is because only the fourth PS element 440 is activated, among the fourth PS elements 410-440, in order for the second delay to be configured to be 90°.

In operation 1040, if the second delay is 180°, the wireless communication device 260 may be deemed normal (or acceptable) in operation 1060. For example, it may be determined whether or not the wireless communication device 260 is normal (acceptable) by configuring the delay of multiple TX PSs to be 0°, 22.5°, 45°, 90°, or 180° and then determining whether or not the signal RX power is included in a designated section in each case.

The reason it is possible to determine whether or not the wireless communication device 260 is normal (or acceptable) by changing the phase delay of multiple TX PSs 314-1 to 314-16 a maximum of five times and then identifying whether or not the RX power of the signal satisfies a designated condition in each case, may be identified from Table 2 below:

TABLE 2

|  | First PS element 410 | Second PS element 420 | Third PS element 430 | Fourth PS element 440 |
| --- | --- | --- | --- | --- |
| 0° | 0 | 0 | 0 | 0 |
| 22.5° | 0 | 1 | 0 | 0 |
| 45° | 0 | 0 | 1 | 0 |
| 90° | 0 | 0 | 0 | 1 |
| 180° | 1 | 0 | 0 | 0 |

Table 2 corresponds to a partial extraction from Table 1. The description that the power of a transmitted signal satisfies a designated condition in a state in which multiple TX PSs 314-1 to 314-16 are all configured at 22.5°, 45°, 90°, or 180° may mean normal operations of components other than the multiple TX PSs 314-1 to 314-16, among components included in TX paths of multiple TX/RX signal processing sub-circuits 310-1 to 310-16, or antenna elements included in the first array antenna 280 or the second array antenna 285, the second PS element 420 included in the multiple TX PSs 314-1 to 314-16, the third PS element 430 included in the multiple TX PSs 314-1 to 314-16, the fourth PS element 440 included in the multiple TX PSs 314-1 to 314-16, or the first PS element 410 included in the multiple TX PSs 314-1 to 314-16, respectively. For example, if the power of a transmitted signal satisfies a designated condition in the case of a 0° configuration, the same may mean normal operations of components other than the multiple TX PSs 314-1 to 314-16, among components included in TX paths of multiple TX/RX signal processing sub-circuits 310-1 to 310-16, or antenna elements included in the first array antenna 280 or the second array antenna 285. As another example, if the power of a transmitted signal satisfies a designated condition in the case of a 22.5° configuration, the same may mean a normal operation of the second PS element 420 included in the multiple TX PSs 314-1 to 314-16.

Other angles (for example, 67.5°) than 0°, 22.5°, 45°, 90°, and 1800 may be implemented by a combination of the first to fourth PS elements 410-440. For example, it is unnecessary to manually identify the beam characteristics with regard to the remaining angles, in order to identify whether or not the wireless communication device 260 operates normally. For example, the wireless communication device 260 does not have to transmit a signal when multiple TX PSs 314-1 to 314-16 are configured to have a delay corresponding to one of the remaining angles (for example, 67.5°). 67.5° may be implemented by activating the second PS element 420 and the third PS element 430. Therefore, if a signal transmitted when the multiple TX PSs 314-1 to 314-16 are configured at 22.5° (corresponding bit string is [0,1,0,0]) and a signal when the same are configured at 45° (corresponding bit string is [0,0,1,0]) satisfy a designated condition, then it may be reasonable to consider that the transmitted signal would also satisfy the condition even when the same are configured at 67.5° (bit string is [0,1,1,0]).

Referring to FIG. 9 and FIG. 10, if the wireless communication device 260 is deemed unacceptable (operation 940 or 1070), it may be confirmed, based on the value of the first or second delay, that an unacceptable component is included in components (for example, multiple PAs 316-1 to 316-16, multiple PPAs 315-1 to 315-16, multiple PSDAs 316-1 to 316-16, multiple TX PSs 314-1 to 314-16) included in at least one of multiple TX/RX signal processing sub-circuits 310-1 to 310-16 included in the wireless communication device 260, or the same is included in antenna elements included in the first array antenna 280 or the second array antenna 285.

For example, if the wireless communication device 260 is deemed unacceptable, based on the value of the first delay, in operation 940, it may be confirmed that an unacceptable component is included in components (for example, multiple TX PSs 314-1 to 314-16, multiple PAs 316-1 to 316-16, multiple PPAs 315-1 to 315-16, multiple PSDAs 316-1 to 316-16, and the like) included in the TX path of at least one of multiple TX/RX signal processing sub-circuits 310-1 to 310-16 included in the wireless communication device 260, or the same is included in antenna elements included in the first array antenna 280 or the second array antenna 285.

As another example, if the wireless communication device 260 is deemed unacceptable, based on the value of the second delay, in operation 1070, it may be confirmed that a TX PS (at least one of 314-1 to 314-16) included in at least one of TX/RX signal processing sub-circuits 310-1 to 310-16 included in the wireless communication device 260 is unacceptable.

However, even if the wireless communication device 260 is deemed unacceptable (operation 940 or 1070), it is impossible to specify the TX/RX signal processing sub-circuit including the unacceptable module. For example, even if the second TX PS 314-2 included in the second TX/RX signal processing sub-circuit 310-2 among the multiple TX/RX signal processing sub-circuits 310-1 to 310-16 is actually unacceptable, the embodiment illustrated in FIG. 9 simply makes it possible to know that the wireless communication device 260 includes at least one unacceptable TX PS, but it is impossible to identify which TX/RX signal processing sub-circuit among the multiple TX/RX signal processing sub-circuits 310-1 to 310-16 includes the unacceptable TX PS. Therefore, a method for specifying the TX/RX signal processing sub-circuit including the unacceptable TX PS will be described with reference to FIG. 11 and FIG. 12.

Figure 11:
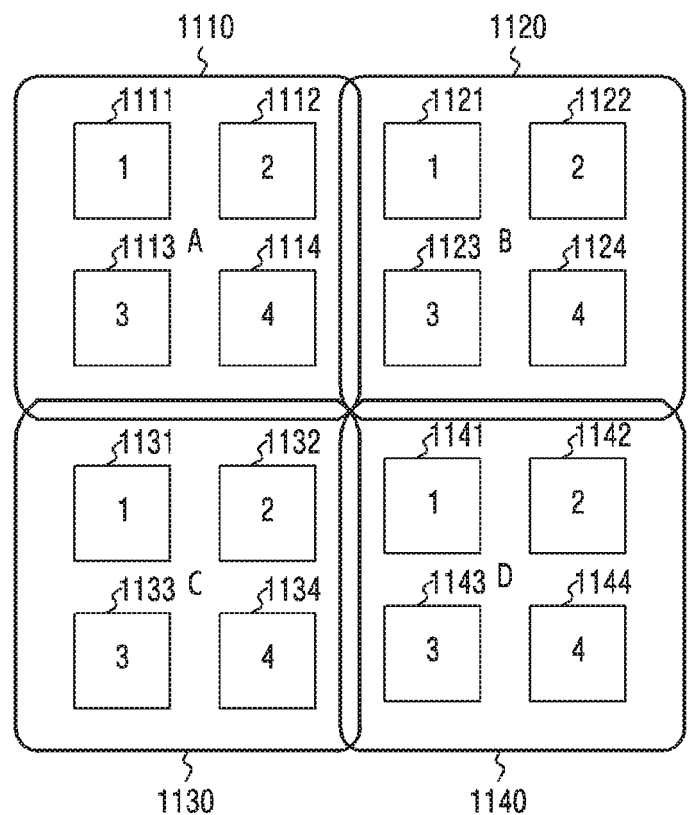
FIG. 11 is a diagram illustrating a method for identifying the cause of unacceptability of a wireless communication device, which has been confirmed unacceptable, according to various embodiments of the disclosure.

FIG. 11 is a diagram illustrating a method for identifying the cause of unacceptability of a wireless communication device, which has been deemed unacceptable, according to various embodiments of the disclosure.

FIG. 11 illustrates multiple (for example, 16) antenna elements 1111-1114, 1121-1124, 1131-1134, and 1141-1144 disposed on a dielectric material (for example, substrate) in a 4×4 array type. In an embodiment, the multiple antenna elements may be included in at least one of a first array antenna 280 or a second array antenna 285. In an embodiment, the multiple antenna elements may be connected to TX/RX signal processing sub-circuits (for example, first TX/RX signal processing sub-circuit 310-1 to $16^{th}$ TX/RX signal processing sub-circuit 310-16). For example, the first antenna element 1111 in group A 1110 may be connected to the first TX/RX signal processing sub-circuit 310-1. As another example, the second antenna element 1112 in group A 1110 may be connected to the second TX/RX signal processing sub-circuit 310-2. As another example, the first antenna element 1121 in group B 1120 may be connected to the fifth TX/RX signal processing sub-circuit 310-5.

In an embodiment, the multiple (for example, 16) antenna elements may be grouped into at least two groups. For example, the multiple (for example, 16) antenna elements may be grouped into four groups (group A 1110, group B 1120, group C 1130, and group D 1140). In an embodiment, antenna elements grouped into a group may or may not be adjacent to each other. In another embodiment, the number of antenna elements included in at least two groups may be identical or different.

Figure 12:
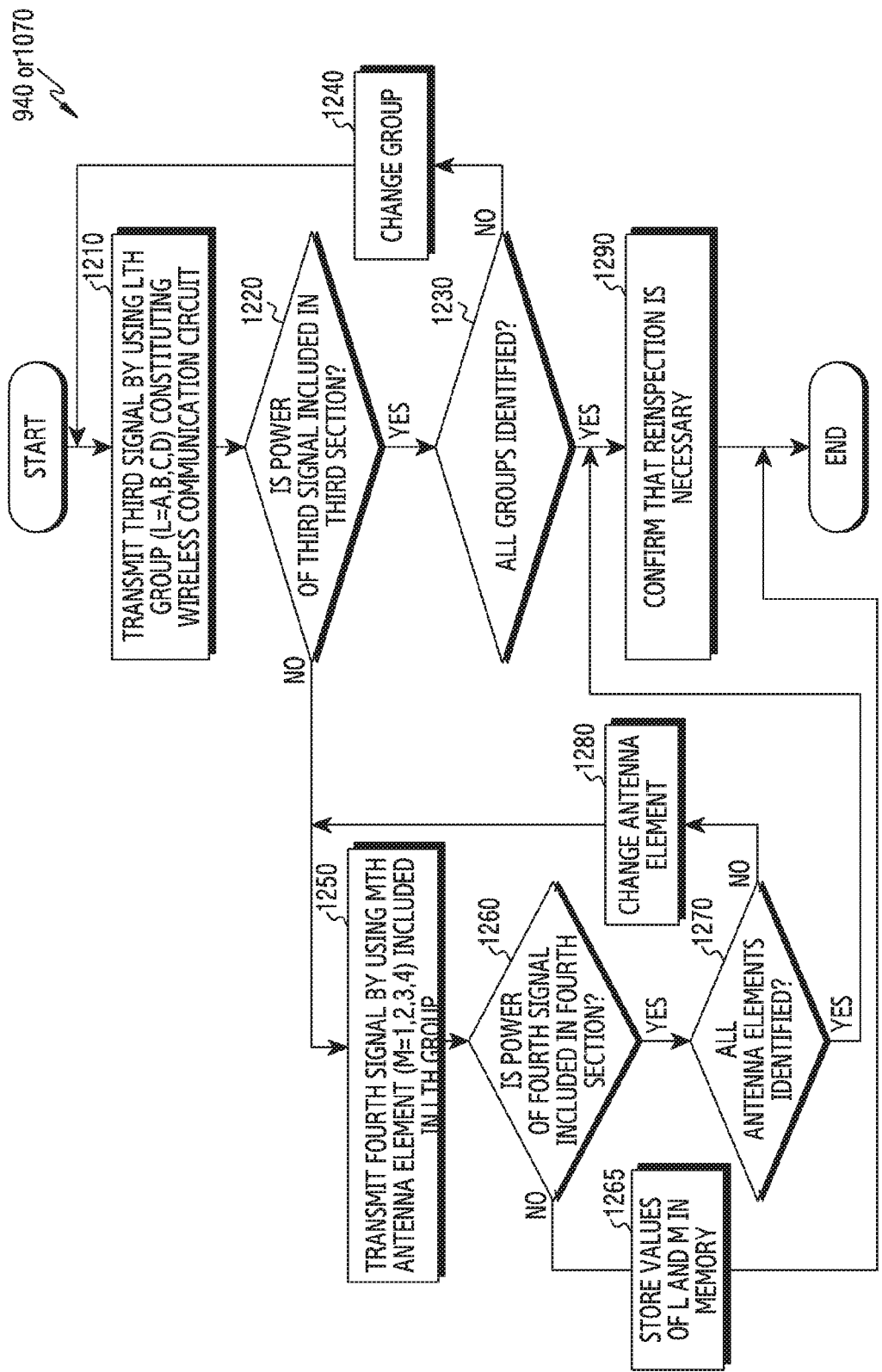
FIG. 12 is a flowchart for identifying the cause of unacceptability of a wireless communication device, which has been confirmed unacceptable, according to various embodiments of the disclosure.

FIG. 12 is a flowchart for identifying the cause of unacceptability of a wireless communication device, which has been deemed unacceptable, according to various embodiments of the disclosure.

In an embodiment, the wireless communication device may be the wireless communication device 260 in FIG. 2.

FIG. 12 may be a detailed flowchart of operation 940 in FIG. 9 or operation 1070 in FIG. 10.

In operation 1210, the wireless communication device 260 may be caused to transmit a third signal by using an $L^{th}$ group included in the wireless communication device 260. In an embodiment, the $L^{th}$ group may be one of group A 1110, group B 1120, group C 1130, and group 1140 illustrated in FIG. 11. For example, the wireless communication device 260 may transmit a third signal by using $A^{th}$ group 1110.

In an embodiment, the description that a third signal is transmitted by using the $L^{th}$ group may mean that a beam formed by using only antenna elements included in the $L^{th}$ group is transmitted. For example, the wireless communication device 260 may solely activate antenna elements 1111-1114 included in the $A^{th}$ group 1110 and TX/RX signal processing sub-circuits (first TX/RX signal processing sub-circuit 314-1 to fourth TX/RX signal processing sub-circuit 314-4) corresponding to the antenna elements included in the $A^{th}$ group 1110, and may transmit a beam formed by using only antenna elements 1111-1114 included in the group A 1110.

In operation 1220, it may be identified whether or not power of the third signal is included in a third section. In an embodiment, it may be identified whether or not power of a third signal, determined based on the signal strength of the third signal received through a signal detecting device (for example, signal detecting device 511-1), is included in the third section. In an embodiment, the third section may be a section designated to determine whether or not antenna elements included in the $L^{th}$ group or TX/RX signal processing sub-circuits corresponding to the antenna elements included in the $L^{th}$ group are unacceptable. In an embodiment, the third section may be determined according to the number or position of antenna elements included in the $L^{th}$ group.

In operation 1230, it may be identified whether or not operation 1220 has been performed with regard to all groups included in the wireless communication device 260. If it is identified that operation 1220 has not been performed with regard to all groups, it is possible to proceed to operation 1240 and to change the $L^{th}$ group to another group for which operation 1220 has not yet been performed. In an embodiment, groups may be changed successively. For example, if power of the third signal transmitted by using group A 1110 is included in the third section, the $L^{th}$ group may be changed form group A 1110 to group B 1120. In an embodiment, operations 1210 and 1220 may be performed repeatedly with regard to the changed group (for example, group B 1120).

In operation 1230, if it is identified that operation 1220 has been performed with regard to all groups, it may be confirmed in operation 1290 that reinspection of the wireless communication device 260 is necessary. For example, although it has been confirmed in operation 940 or 1070 that at least one of the multiple TX/RX signal processing sub-circuits 310-1 to 310-16 included in the wireless communication device 260 includes an unacceptable component, it has been confirmed as a result of additional identification (for example, loop formed by operations 1210-1240) that each of all groups included in the wireless communication device 260 is not unacceptable. Accordingly, it may be confirmed that reinspection of the wireless communication device 260 is necessary.

In operation 1220, if the power of the third signal transmitted by using the $L^{th}$ group is not included in the third section, it is possible to proceed to operation 1250. In an embodiment, if the power of the third signal transmitted by using the $L^{th}$ group is not included in the third section, it may be confirmed that at least one of the antenna elements included in the $L^{th}$ group or the TX/RX signal processing sub-circuits corresponding to the antenna elements included in the $L^{th}$ group is unacceptable. For example, if the power of the third signal transmitted by using the $A^{th}$ group 1110 is not included in the third section, it may be confirmed that at least one of the antenna elements 1111-1114 included in the $A^{th}$ group 1110 or multiple TX/RX signal processing sub-circuits 310-1 to 310-4 corresponding to the antenna elements 1111-1114 included in the $A^{th}$ group 1110 is unacceptable.

In operation 1250, the wireless communication device 260 may be caused to transmit a fourth signal by using $M^{th}$ antenna elements included in the $L^{th}$ group. Since it has been confirmed in operation 1220 that at least one of the antenna elements included in the $L^{th}$ group or the TX/RX signal processing sub-circuits corresponding to the antenna elements included in the $L^{th}$ group is unacceptable, the wireless communication device 260 may be caused to transmit a fourth signal by using only $M^{th}$ antenna elements included in the $L^{th}$ group. For example, if the $L^{th}$ group is group A 1110, the $M^{th}$ antenna element may be one of antenna elements 1111-1114. For example, the wireless communication device 260 may transmit a fourth signal by using the first antenna element 1111 of group A 1110.

In operation 1260, it may be identified whether or not power of the fourth signal is included in a fourth section. In an embodiment, it may be identified whether or not power of a fourth signal, determined based on the signal strength of the fourth signal received through a signal detecting device 511-1, is included in the fourth section. In an embodiment, the fourth section may be a section designated to determine whether or not the $M^{th}$ antenna element included in the $L^{th}$ group is unacceptable. In an embodiment, the fourth section may be determined according to the position of the $M^{th}$ antenna element.

In operation 1260, if it is confirmed that the power of the fourth signal is included in the fourth section, it may be confirmed that the $M^{th}$ antenna element or the TX/RX signal processing sub-circuit corresponding to the $M^{th}$ antenna element is not unacceptable. In addition, it is possible to proceed to operation 1270 and to identify whether or not operation 1260 has been performed with regard to all antenna elements in the $L^{th}$ group.

If it is identified that operation 1260 has not been performed with regard to all antenna elements in the $L^{th}$ group, it is possible to proceed to operation 1280 and to change the $M^{th}$ antenna element to another antenna element, for which operation 1260 has not yet been performed. In an embodiment, antenna elements may be changed successively. For example, if the power of the fourth signal transmitted by using the first antenna element 1111 in group A 1110 is included in the fourth section, the antenna element may be changed from the first antenna element 1111 in group A to the second antenna element 1112 in group A.

If it is identified that operation 1260 has been performed with regard to all antenna elements in the $L^{th}$ group, and that the power of the fourth signal is included in the fourth section in all cases, it may be confirmed in operation 1290 that reinspection of the wireless communication device 260 is necessary. For example, although it has been confirmed in operation 1220 that at least one of the antenna elements included in the $A^{th}$ group or TX/RX signal processing sub-circuits corresponding to the antenna elements included in the $A^{th}$ group is unacceptable, it has been confirmed as a result of additional identification (for example, loop formed by operations 1250-1280) that each of the antenna elements included in the $A^{th}$ group (or the TX/RX signal processing sub-circuits corresponding to the antenna elements included in the $A^{th}$ group) is not unacceptable. Accordingly, it may be confirmed that reinspection of the wireless communication device 260 is necessary.

In operation 1260, if it is confirmed that the power of the fourth signal is not included in the fourth section, it may be confirmed that the $M^{th}$ antenna element or the TX/RX signal processing sub-circuit corresponding to the $M^{th}$ antenna element is an unacceptable element. In an embodiment, values of L and M may be stored in the memory of the wireless communication device 260 or in the memory of an external device (for example, PC 550-1 in FIG. 5A). For example, information L=A, M=4 may be stored in the memory.

In the case of a detailed operation of operation 940, the information L=A, M=4 may indicate the fact that the fourth antenna element 1114 of group A 1110 or the fourth TX/RX signal processing sub-circuit 310-4 connected to the fourth antenna element 1114 of group A 1110 includes an unacceptable element. For example, the unacceptable element may be the fourth PPA 315-4.

In the case of a detailed operation of operation 1070, the information L=A, M=4 may indicate the fact that the fourth TX PS 314-1 included in the fourth TX/RX signal processing sub-circuit 310-4 connected to the fourth antenna element 1114 of group A 1110 is an unacceptable element. In an embodiment, it may be determined which PS element among the fourth TX PS 314-4 (unacceptable element) is unacceptable, according to the second delay value. For example, if the second delay value is 45°, the third PS element 430 among the fourth TX PS 314-4 may be determined to be unacceptable.

In an embodiment, at least one of identification information of the wireless communication device 260, power of the third signal, power of the fourth signal, the second delay value, time or place at which the unacceptable element is identified, may be recorded in the memory of the wireless communication device 260 or in the memory of an external device.

Figure 13:
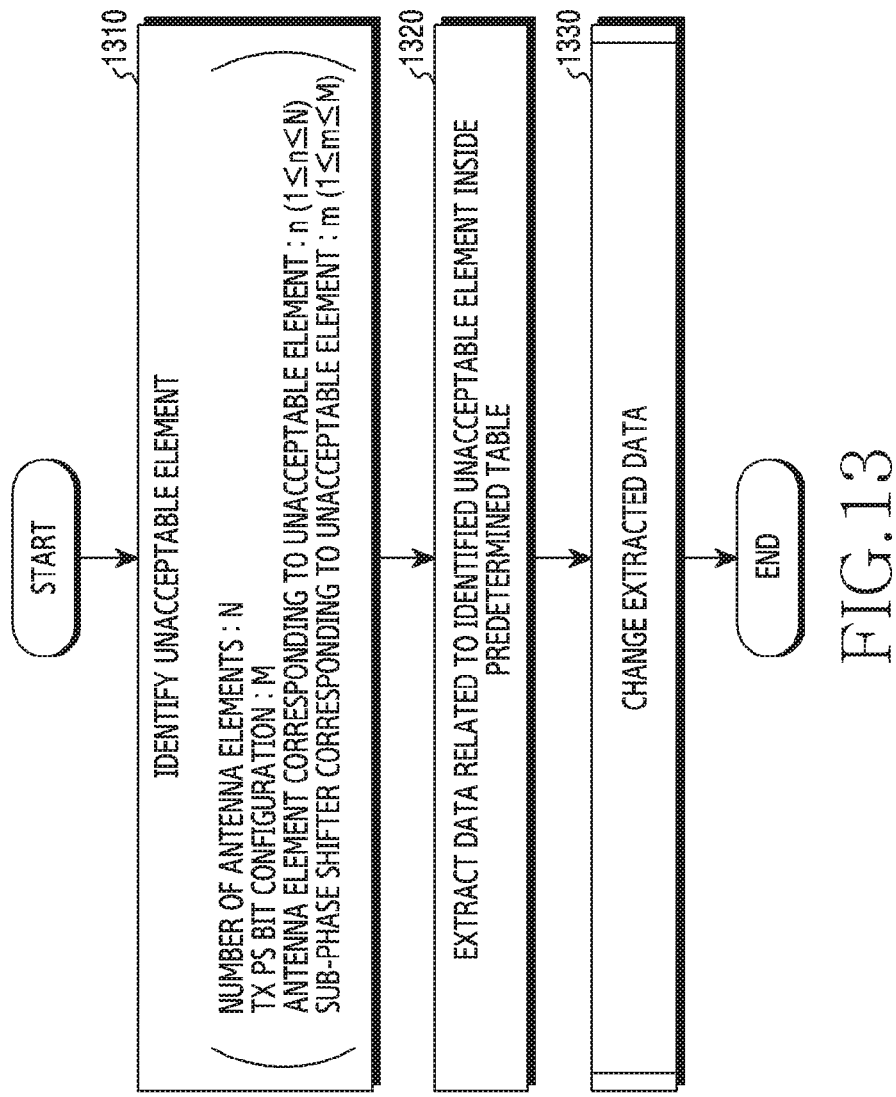
FIG. 13 is a flowchart of an electronic device according to various embodiments of the disclosure.

FIG. 13 is a flowchart of an electronic device according to various embodiments of the disclosure.

In an embodiment, the electronic device may be the electronic device 200.

In operation 1310, the electronic device 200 may identify an unacceptable element. For example, the unacceptable element may be the third PS element 430 of the third TX PS 314-3 included in the third TX/RX signal processing sub-circuit 310-3.

It will be assumed for convenience of description that an array antenna is formed in 1×N type; the TX PS is formed by M bits; the antenna element corresponding to the unacceptable element is the $n^{th}$ (1<=n<=N); and the PS element corresponding to the unacceptable element is the $m^{th}$ (1<=m<=M). For example, N=4, M=4 may be the case. In the previous example, n=3, m=3 may be the case. It will be assumed in the following that N=4, M=4.

In operation 1320, the electronic device 200 may extract data related to the identified unacceptable element inside a designated table. In an embodiment, the designated table may be stored in a memory 214.

TABLE 3

| 2$^{nd}$ angle | 1$^{st}$ angle | | | | |
|---|---|---|---|---|---|
| | −60° | −30° | 0 | 30 | 60 |
| −60° | 0C61 | 0E32 | 301C | 02F9 | 02FA |
| −30° | 0C66 | 0E35 | 303E | 00AE | 01AD |
| 0° | C0A9 | 7049 | 2039 | 00A9 | B049 |
| 30° | 0E3B | 0E3E | 2031 | 00B1 | 02D2 |
| 60° | 0D6F | 0C6C | 2032 | 00B2 | 02F7 |

Table 3 enumerates configuration information necessary to form a beam in a designated direction, stored in the memory 214. The configuration information necessary to form a beam in a designated direction may be a beambook table.

In an embodiment, assuming that the electronic device 200 is the origin, and straight lines intersecting at the origin perpendicularly to one another are x-axis, y-axis, and z-axis, the first angle may refer to the angle between a designated direction and the z-axis. In an embodiment, the z-axis may correspond to the vertical direction, and the first angle may be expressed as a latitude.

In an embodiment, using the z-axis as an axis, the second angle may refer to the angle between the designated direction the x-axis in the positive direction. In an embodiment, the second angle may be expressed as a longitude.

In an embodiment, values forming the beambook table may be hexadecimal expressions of information regarding activation or deactivation of multiple (for example, N) TX PSs (for example, first TX PS 314-1 to fourth TX PS 314-1). Accordingly, an array antenna may include four antenna elements (for example, first antenna element to fourth antenna element), the antenna elements may be connected to TX/RX signal processing sub-circuits (for example, first TX/RX signal processing sub-circuit 310-1 to fourth TX/RX signal processing sub-circuit 310-4), the TX/RX signal processing sub-circuits 310-1 to 310-4 may include TX PSs 314-1 to 314-4, and the TX PSs 314-1 to 314-4 may include M PS elements 410-440. For example, the third antenna element may be connected to the third TX/RX signal processing sub-circuit 310-3, the third TX/RX signal processing sub-circuit 310-3 may include a third TX PS 314-3, and the third TX PS 314-3 may include fourth PS elements 410-440.

For example, the first angle of −60° and the second angle of −60° may correspond to configuration information of "0C61". "0C61" is expressed, in a binary system, as [0000 1100 0110 0001]. Among this, the first bit string 0000 may correspond to the first TX PS 314-1, the second bit string 1100 may correspond to the second TX PS 314-2, the third bit string 0110 may correspond to the third TX PS 314-3, and the fourth bit string 0001 may correspond to the fourth TX PS 314-4. The bit value included in a bit string may indicate activation or deactivation of the PS element corresponding to the position of the bit value. For example, the first bit string 0000 may instruct deactivation of all PS elements of the first TX PS 314-1, the second bit string 1100 may instruct activation of the first and second PS elements of the s second TX PS 314-2, the third bit string 0110 may instruct activation of the second and third PS elements of the third TX PS 314-3, and the fourth bit string 0001 may instruct activation of the fourth PS element of the fourth TX PS 314-4.

In an embodiment, the electronic device 200 may extract data for using (or activating) the $m^{th}$ PS element among the $n^{th}$ TX PS 314-$n$ included in the $n^{th}$ TX/RX signal processing sub-circuit 310-$n$ corresponding to the $n^{th}$ antenna element, inside a designated table. For example, one or more pieces of data, such as "0C61", "0066", "C0A9", and "0D6F", may be extracted.

In operation 1330, the electronic device 200 may change the extracted data. For example, the electronic device 200 may change the extracted data such that, instead of using (or activating) an identified unacceptable element, one or more elements related to the identified unacceptable element are used (of activated). Details thereof will be described with reference to FIG. 14.

Figure 14:
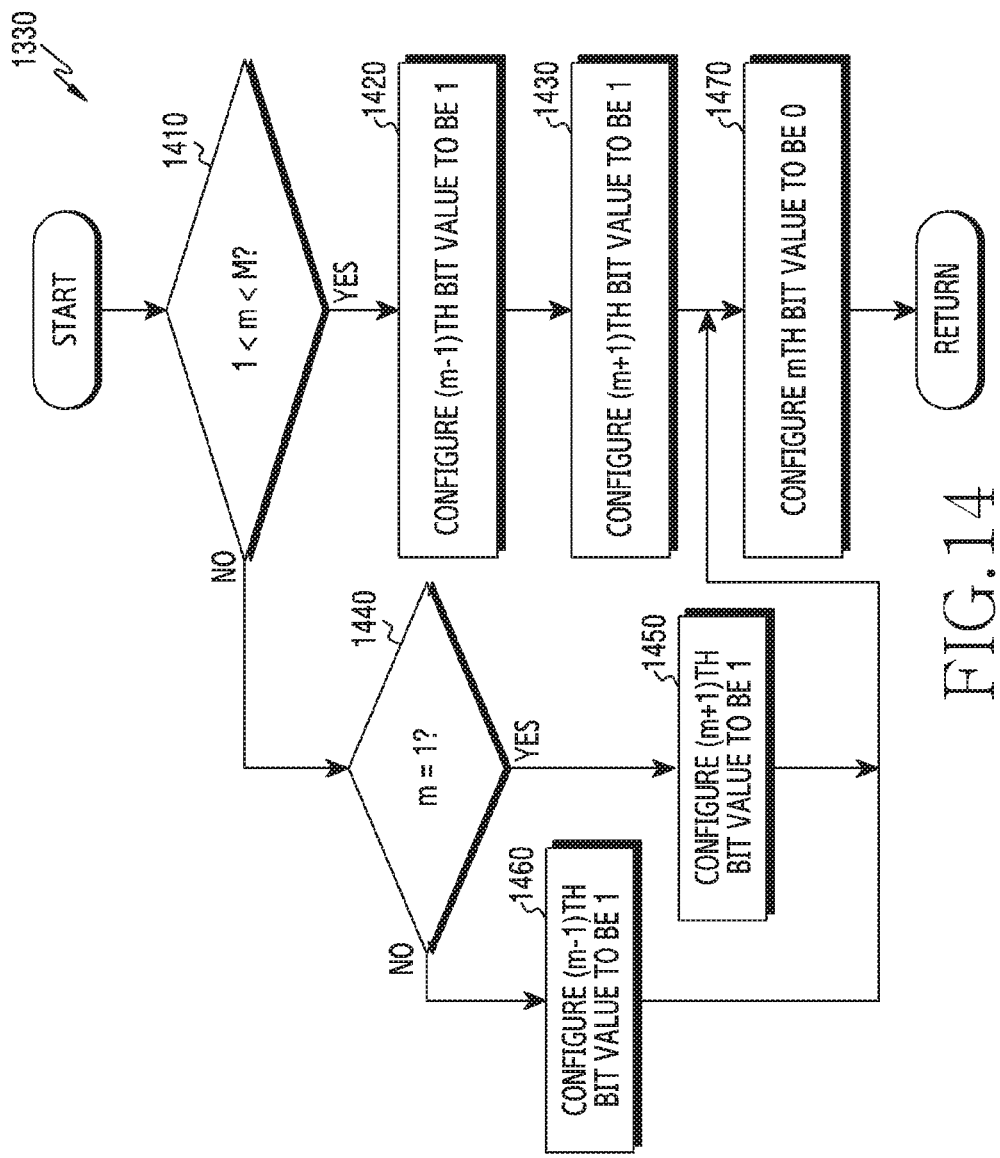
FIG. 14 is a flowchart of an electronic device according to various embodiments of the disclosure.

FIG. 14 is a flowchart of an electronic device according to various embodiments of the disclosure.

In an embodiment, FIG. 14 may be a detailed flowchart of operation 1330 in FIG. 13.

In operation 1410, it may be identified if the value of m is larger than 1 and smaller than M. For example, if the unacceptable element is the first PS element 410 of the third TX PS 314-3 included in the third TX/RX signal processing sub-circuit 310-3 (n=3, m=1), m is not larger than 1, and it is thus possible to proceed to operation 1440.

In operation 1440, it may be identified if it may be identified if m=1. If m=1 is identified, the (m+1)$^{th}$ bit value may be configured to be 1 in operation 1450. For example, if the extracted data is "0C61 or [0000 1100 0110 0001]", and if the unacceptable element is the first PS element 410 of the third TX PS 314-3 included in the third TX/RX signal processing sub-circuit 310-3 (n=3, m=1), the second bit of the third bit string 0110 may be configured to be 1. In this case, the second bit of the third bit string 0110 is already 1, and the bit value does not change.

If m=1 is not the case in operation 1440, m=M is identified. In operation 1460, the (m−1)$^{th}$ bit value may be configured to be 1. For example, if the extracted data is "0C61 or [0000 1100 0110 0001]", and if the unacceptable element is the fourth PS element 440 of the second TX PS 314-2 included in the second TX/RX signal processing sub-circuit 310-2 (n=2, m=4), the third bit of the second bit string 1100 may be configured to be 1.

After performing operation 1450 or 1460, the $m^{th}$ bit may be configured to be 0, in operation 1470. Operation 1470 may be intended to form a beam without using an unacceptable element.

In operation 1410, if m is larger than 1 and smaller than M, the $(m-1)^{th}$ bit may be configured to be 1 in operation 1420, and the $(m+1)^{th}$ bit may be configured to be 1. For example, if the extracted data is "0C61 or [0000 1100 0110 0001]", and if the unacceptable element is the second PS element 420 of the third TX PS 314-3 included in the third TX/RX signal processing sub-circuit 310-3 (n=3, m=2), the first and third bits of the third bit string 0101 may be configured to be 1. In addition, in operation 1470, the second bit of the third bit string may be configured to be 0. Through operations 1420, 1430, and 1470, the third bit string is changed from 0110 to 1010.

Figure 15:
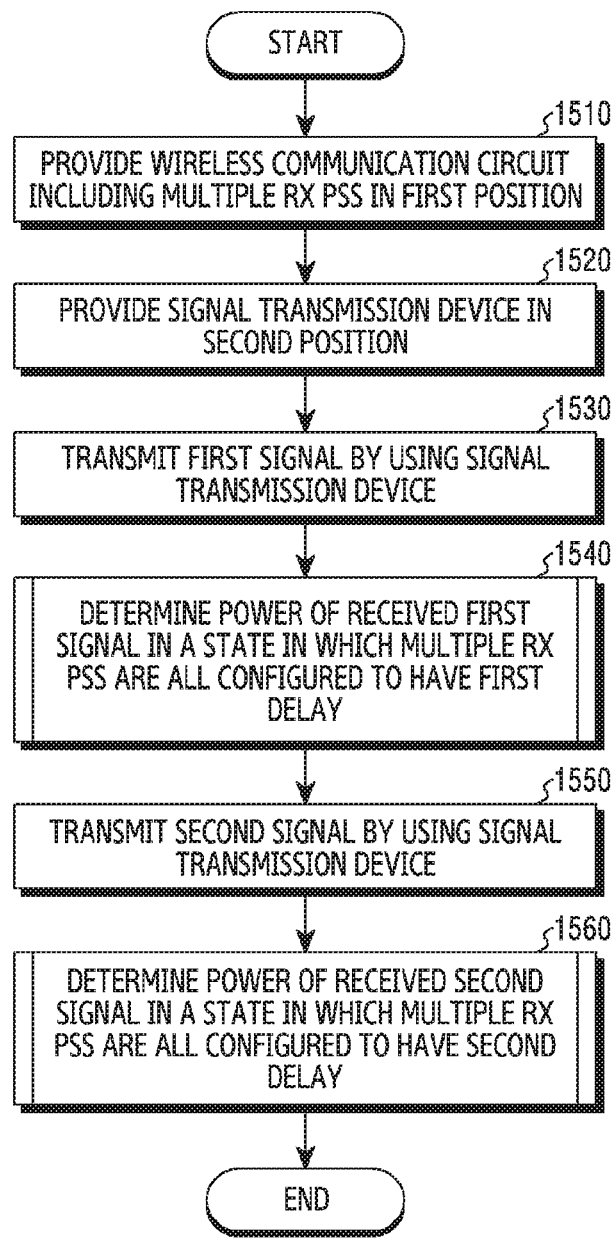
FIG. 15 is a flowchart for identifying whether or not a wireless communication device operates normally, according to various embodiments of the disclosure.

FIG. 15 is a flowchart for identifying whether or not a wireless communication device operates normally, according to various embodiments of the disclosure.

In an embodiment, the wireless communication device may be the wireless communication device 260 in FIG. 2.

In operation 1510, the wireless communication device 260 including multiple RX PSs may be provided in a first position.

In an embodiment, the first position may be the position of a first cradle 530-3 of an RX measurement environment (for example, RX measurement environment 500-3 in FIG. 5C).

In an embodiment, the wireless communication device 260 may include multiple (for example, 16) TX/RX signal processing sub-circuits, and at least some TX/RX signal processing sub-circuits may be activated. The number of at least some activated TX/RX signal processing sub-circuits may be N.

For example, if N=16, the wireless communication device 260 include a first TX/RX signal processing sub-circuit 310-1 to a $16^{th}$ TX/RX signal processing sub-circuit 130-16. It will be assumed in the following that N=16.

In an embodiment, the TX/RX signal processing sub-circuits 310-1 to 310-16 may include, in an RX path, RX PSs 312-1 to 312-16. For example, the first TX/RX signal processing sub-circuit 310-1 may include a first RX PS 312-1. In an embodiment, the RX PSs 312-1 to 312-16 may include multiple PS elements, and the number of PS elements may be determined according to the bit configuration of the RX PS. For example, in the case of a four-bit configuration, the first RX PS 312-1 may include a first PS element 410 to a fourth PS element 440.

In operation 1520, a signal transmission device (for example, signal transmission device 511-3) may be provided in a second position. In an embodiment, the second position may be the position of a second cradle 510-3 in the RX measurement environment 500-3.

In operation 1530, the signal transmission device 511-3 may be caused to transmit a first signal.

In an embodiment, the signal transmission device 511-3 provided in the second position may transmit a first signal, based on at least one of a signal that is input from an external device (for example, signal generator 540-3 in FIG. 5C), a command therefrom, or an instruction stored in the memory of the signal transmission device 511-3. In an embodiment, the first signal may be an RF signal or a beam formed in a designated direction.

In operation 1540, in a state in which the multiple RX PSs are all configured to have a first delay, the power of the first signal received through the wireless communication device 260 may be determined.

In an embodiment, a signal analyzer 520-3 connected to the wireless communication device 260 may determine the power of the first signal. In another embodiment, the electronic device 200 including the wireless communication device 260 may determine the power of the first signal.

In operation 1550, the signal transmission device 511-3 may be caused to transmit a second signal.

In an embodiment, the second signal and the first signal may be beams facing in the same direction.

In operation 1560, in a state in which the multiple RX PSs are all configured to have a second delay, the power of the second signal received through the wireless communication device 260 may be determined.

In an embodiment, the signal analyzer 520-3 connected to the wireless communication device 260 may determine the power of the second signal. In another embodiment, the electronic device 200 including the wireless communication device 260 may determine the power of the second signal.

Although not illustrated, it may be identified, based on the power of the first signal and the power of the second signal, whether or not the wireless communication device 260 operates normally. For example, if the power of the first signal does not belong to the first section, or if the power of the second signal does not belong to the second section, it may be identified that the wireless communication device 260 is abnormal (or unacceptable) or includes an unacceptable element. As another example, if the power of the first signal belongs to the first section, or if the power of the second signal belongs to the second section, it may be identified that the wireless communication device 260 is normal (or acceptable) or includes no unacceptable element.

Figure 16:
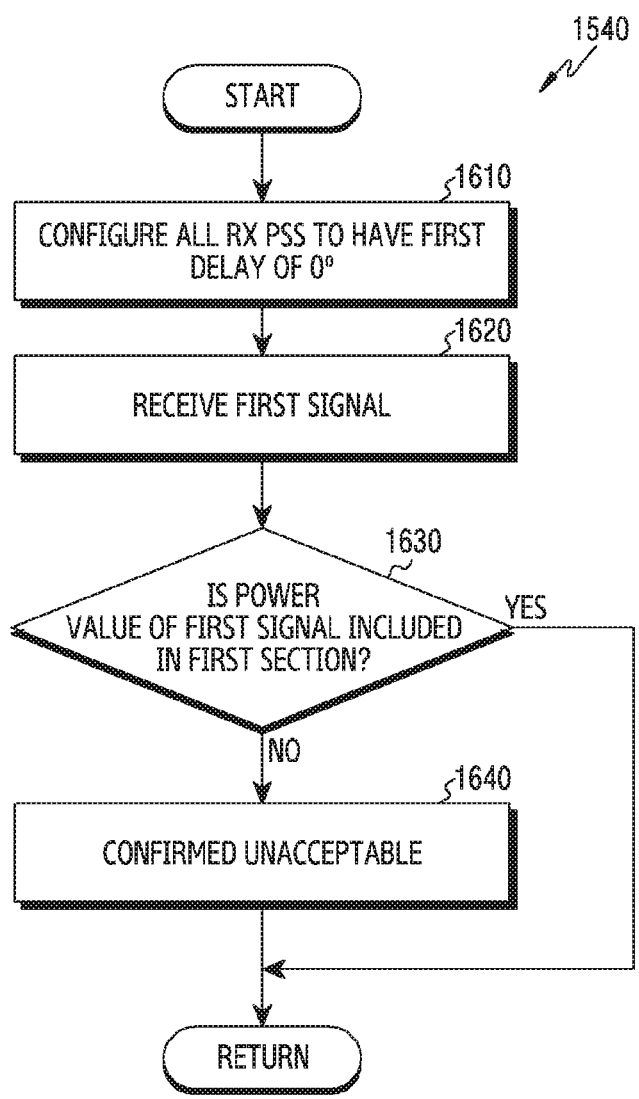
FIG. 16 is a flowchart for identifying whether or not a wireless communication device operates normally, according to various embodiments of the disclosure.

FIG. 16 is a flowchart for identifying whether or not a wireless communication device according to various embodiments of the disclosure operates normally.

In an embodiment, the wireless communication device may be the wireless communication device 260 in FIG. 2.

In an embodiment, FIG. 16 may be a detailed flowchart of operation 1540 in FIG. 15.

In operation 1610, multiple RX PSs 312-1 to 312-16 may all be configured to have a first delay of 0°. For example, the first RX PS 312-1 of the first TX/RX signal processing sub-circuit 310-1 to the $16^{th}$ RX PS 312-16 of the $16^{th}$ TX/RX signal processing sub-circuit 310-16 may be configured to have a delay of 0°. For example, the first PS element 410 to the fourth PS element 440 of the first RX PS 312-1 may all be deactivated.

In operation 1620, the wireless communication device 260 may receive a first signal. In an embodiment, the wireless communication device 260 may receive a first signal transmitted by a signal transmission device 511-3.

In operation 1630, it may be identified whether or not the power value of the first signal is included in a first section. In an embodiment, it may be identified whether or not the power of the first signal detected by a signal analyzer 520-3 is included in the first section. In an embodiment, the first section may be a section designated to determine the initial unacceptability of the wireless communication device 260.

For example, if it is identified that the power of the first signal is included in the first section, it is possible to proceed to operation 1550 in FIG. 15. If it is identified that the power of the first signal is included in the first section, then it may be identified that no unacceptable element is included in components (for example, multiple LNAs 311-1 to 311-16) other than multiple RX PSs 312-1 to 312-16, among the components included in the RX path of multiple TX/RX signal processing sub-circuits 310-1 to 310-16, or no unacceptable element is included in antenna elements and the like included in the first array antenna 280 or the second array antenna 285.

If it is identified that the power of the first signal is not included in the first section, it is possible to proceed to operation 1640. In operation 1640, the wireless communication device 260 may be deemed unacceptable. For example, it may be identified that an unacceptable element is included in components (for example, multiple RX PSs 312-1 to 312-16, multiple LNAs 311-1 to 311-16, and the like) included in the RX path of multiple TX/RX signal processing sub-circuits 310-1 to 310-16, or an unacceptable element is included in antenna elements and the like included in the first array antenna 280 or the second array antenna 285.

In an embodiment, at least one of identification information of the wireless communication device 260, power of the first signal, time or place at which the unacceptability is identified, may be recorded in the memory of the wireless communication device 260 or in the memory of an external device (for example, PC 550-3 in FIG. 5C).

Figure 17:
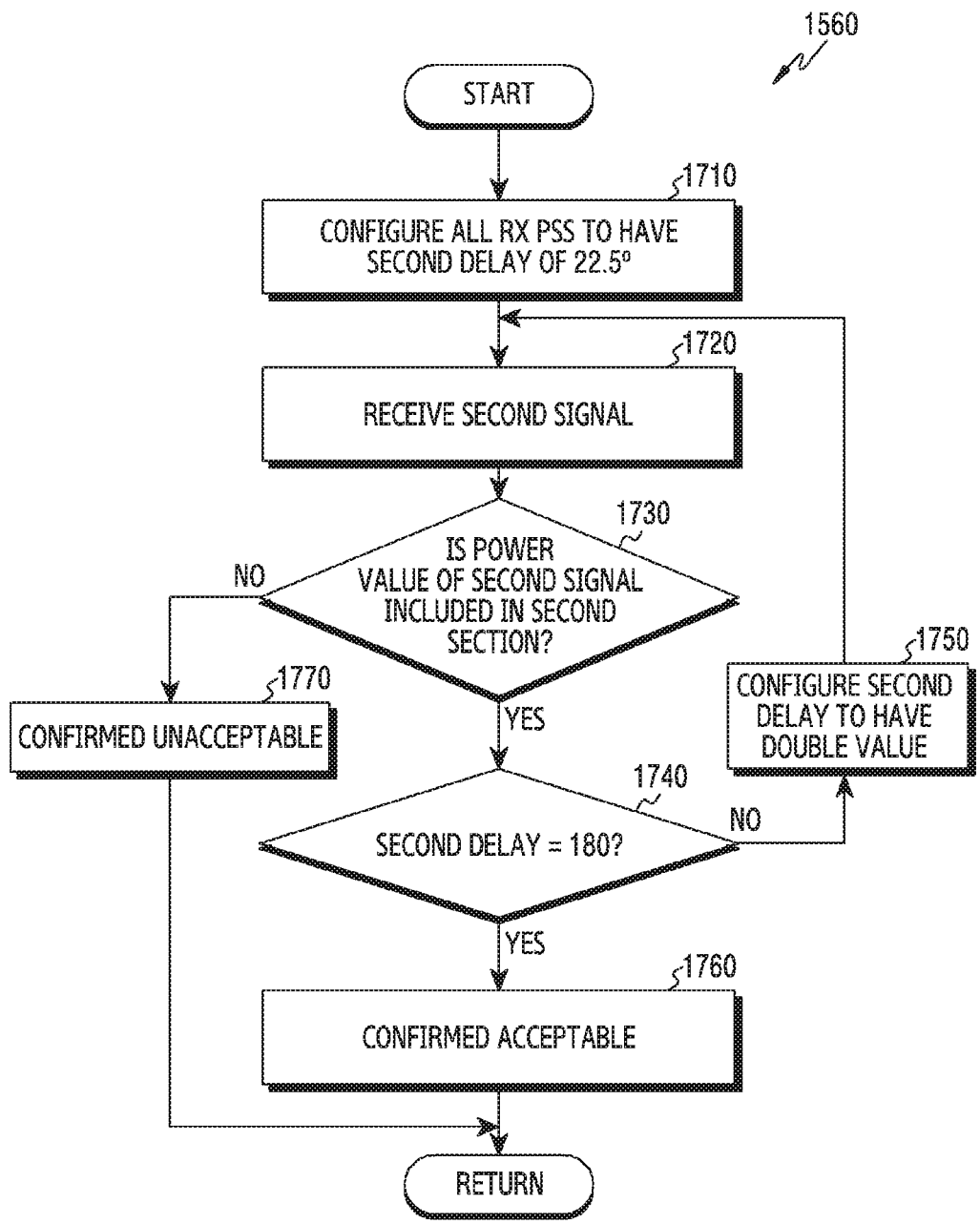
FIG. 17 is a flowchart for identifying whether or not a wireless communication device operates normally, according to various embodiments of the disclosure.

FIG. 17 is a flowchart for identifying whether or not a wireless communication device according to various embodiments of the disclosure operates normally.

In an embodiment, the wireless communication device may be the wireless communication device 260 in FIG. 2.

In an embodiment, FIG. 17 may be a detailed flowchart of operation 1560 in FIG. 15.

In operation 1710, if multiple RX PSs 312-1 to 312-16 have a four-bit configuration, the multiple RX PSs 312-1 to 312-16 may all be configured to have a second delay of 22.59°. For example, the first RX PS 312-1 of the first TX/RX signal processing sub-circuit 310-1 to the 16$^{th}$ RX PS 312-16 of the 16$^{th}$ TX/RX signal processing sub-circuit 310-16 may be configured to have a second delay of 22.5°. For example, among multiple PS elements 410-440 included in the first RX PS 312-1, the second PS element 420 may be activated, and the first, third, and fourth PS elements 410, 430, and 440 may be deactivated.

In operation 1720, the wireless communication device 260 may receive a second signal. In an embodiment, the wireless communication device 260 may receive a first signal transmitted by a signal transmission device 511-3.

In operation 1730, it may be identified whether or not the power of the second signal is included in a second section. In an embodiment, it may be identified whether or not the power of a second signal, determined based on the signal strength of the second signal received through the wireless communication device 260, is included in the second section. In an embodiment, the second section may be irrelevant to the power of the second signal. The second section may be determined according to the power of the first signal. For example, the upper limit of the second section may be obtained by adding the power of the first signal and a reference value, and the lower limit of the second section may be obtained by subtracting the reference value from the power of the first signal.

In operation 1730, if it is identified that the power of the second signal is included in the second section, it may be identified in operation 1740 whether or not the second delay is 180°.

In operation 1740, if the second delay is not 180°, the second delay may be configured to have double the existing value in operation 1750. For example, if the second delay has been configured to be 22.5°, the second delay may be configured to be 45° in operation 1750.

In operation 1740, if the second delay is 180°, the wireless communication device 260 may be deemed normal (or acceptable) in operation 1060. For example, it may be determined whether or not the wireless communication device 260 is normal (or acceptable) by configuring multiple RX PSs to all have a delay of 0°, 22.5°, 45°, 90°, or 180° and then determining whether or not the signal RX power is included in a designated section in each case.

In operation 1730, if it is confirmed that the power of the second signal is not included in the second section, the wireless communication device 260 may be deemed unacceptable in operation 1770. In an embodiment, at least one of identification information of the wireless communication device 260, power of the second signal, the second delay value, time or place at which the unacceptable element is identified, may be recorded in the memory of the wireless communication device 260 or in the memory of an external device (for example, PC 550-3 in FIG. 5C).

A method for identifying characteristics of a wireless communication device (for example, wireless communication device 260) according to various embodiments of the disclosure may include the operations of: providing the wireless communication device in a first position, the wireless communication device including an array of antennas (for example, first array antenna 280) and a wireless communication circuit (for example, wireless communication circuit 300) electrically connected to the array of antennas, the wireless communication circuit being configured to transmit/receive signals having a frequency between 20 GHz to 100 GHz, and the wireless communication circuit including a plurality of phase shifters (for example, first TX PS 314-1 to fourth TX PS 314-4) configured to adjust the phase of the signals to together form a directional beam; providing a signal detecting device (for example, signal detecting device 511-1) in a second position spaced from the first position so as to detect a radio signal from the wireless communication device; causing the wireless communication device to transmit a first signal in a state in which the phase shifters are all configured to have a first delay; detecting first power of the first signal by using the signal detecting device; causing the wireless communication device to transmit a second signal in a state in which the phase shifters are all configured to have a second delay; and detecting second power of the second signal by using the signal detecting device.

According to various embodiments, the difference between the first delay and the second delay may be a multiple of a reference angle, and the reference angle may be obtained by dividing 360° by 2 to the power of the bit number of the phase shifters.

According to various embodiments, the method may further include an operation of detecting a current flowing through the wireless communication circuit while power is applied to the wireless communication circuit.

According to various embodiments, the first delay may be 0°, and the method may further include an operation of determining whether or not the first power is included in a first selected section.

According to various embodiments, the second delay may be an n multiple of the reference angle, n being one of 1, 2, 4, and 8, and the method further include an operation of determining whether or not the second power is included in a second selected section different from the first selected section.

According to various embodiments, the method may further include an operation of confirming the wireless communication device unacceptable, based on confirming that the first power is not included in the first selected section.

According to various embodiments, the operation of confirming the wireless communication device unacceptable may further include an operation of confirming that one of remaining components included in the wireless communication device, other than the plurality of phase shifters, is unacceptable.

According to various embodiments, the operation of detecting second power of the second signal may further include an operation of identifying whether or not the second delay is 180°, when the second power is included in the second selected section.

According to various embodiments, the method may further include an operation of confirming the wireless communication device normal when the second delay is 180°.

According to various embodiments, the method may further include the operations of: configuring the second delay to be double, when the second delay is not 180°; causing the wireless communication device to transmit the second signal in a state in which the phase shifters are all configured to have double the second delay; and detecting second power of the second signal by using the signal detecting device.

According to various embodiments, the method may further include an operation of confirming the wireless communication device unacceptable when the second power is not included in the second selected section.

According to various embodiments, the operation of confirming the wireless communication device unacceptable may further include an operation of confirming that an unacceptable element is included in at least one of the plurality of phase shifters.

An electronic device according to various embodiments of the disclosure may include: a wireless communication device (for example, wireless communication device 260) including an array of antennas (for example, first array antenna 280) and a wireless communication circuit (for example, wireless communication circuit 300) electrically connected to the array of antennas, the wireless communication circuit being configured to transmit/receive signals having a frequency between 20 GHz to 100 GHz, the wireless communication circuit including a plurality of phase shifters (for example, first TX PS 314-1 to fourth TX PS 31404) configured to adjust the phase of the signals to together form a directional beam, and each of the plurality of phase shifters including a designated number of PS elements (for example, first PS element 410 to fourth PS element 440); a processor (for example, processor 240) operatively connected to the wireless communication device; and a memory (for example, memory 130) operatively connected to the processor. The memory may be configured to store instructions that, when executed, cause the processor to: receive information regarding an unacceptable element included in the wireless communication device from an external device (for example, PC 550-1), the unacceptable element including a PS element included in at least one of the plurality of phase shifters; extract data related to the unacceptable element from a table stored in the memory; and change the extracted data.

According to various embodiments, the table may include information regarding activation of the plurality of phase shifters for forming a beam in a designated direction, and the data related to the unacceptable element may include information instructing activation of the unacceptable element in order to form a beam in the designated direction.

According to various embodiments, the instructions may be configured to cause the processor to add, to the extracted data, information instructing deactivation of the unacceptable element and information instructing activation of different elements related to the unacceptable element, thereby changing the extracted data.

A system for identifying characteristics of a wireless communication device (for example, wireless communication device 260) according to various embodiments of the disclosure may include: a signal detecting device (for example, signal detecting device 511-1) and a characteristic identifying device (for example, signal analyzer 520-1). The wireless communication device may include an array of antennas (for example, first array antenna 280) and a wireless communication circuit (for example, wireless communication circuit 300) electrically connected to the array of antennas. The wireless communication circuit may be configured to transmit/receive signals having a frequency between 20 GHz to 100 GHz. The wireless communication circuit may include a plurality of phase shifters (for example, first TX PS 314-1 to fourth TX PS 314-4) configured to adjust the phase of the signals to together form a directional beam. The wireless communication device may be configured to transmit a first signal in a state in which the phase shifters are all configured to have a first delay and to transmit a second signal in a state in which the phase shifters are all configured to have a second delay. The signal detecting device may be configured to receive the first signal and the second signal and to transmit data related to the first signal and the second signal to the characteristic identifying device. The characteristic identifying device may be configured to determine power of the first signal and power of the second signal, based on the data related to the first signal and the second signal, and to identify characteristics regarding quality of the wireless communication device, based on at least one of the determined powers.

According to various embodiments, the difference between the first delay and the second delay may be a multiple of a reference angle, and the reference angle may be obtained by dividing 360° by 2 to the power of the bit number of the phase shifters.

According to various embodiments, the wireless communication device may be configured to detect a current flowing through the wireless communication circuit while power is applied to the wireless communication circuit.

According to various embodiments, the first delay may be 0°, and the characteristic identifying device may be configured to determine whether or not the first power is included in a first selected section.

According to various embodiments, the second delay may be an n multiple of the reference angle, n being one of 1, 2, 4, and 8, and the characteristic identifying device may be configured to determine whether or not the second power is included in a second selected section different from the first selected section.

Embodiments of the disclosure disclosed in the specification and the drawings are merely specific examples presented to easily describe the technical content according to embodiments of the disclosure and to help understanding of the disclosure, and are not intended to limit the scope of embodiments of the disclosure. Accordingly, the scope of various embodiments of the disclosure is to be interpreted include not only embodiments disclosed herein, but also all changed or modified forms derived based on the technical idea of various embodiments of the disclosure.

The invention claimed is:

1. A method for identifying characteristics of a wireless communication device, the method comprising:
  providing the wireless communication device in a first position, the wireless communication device comprising an array of antennas and a wireless communication circuit electrically connected to the array of antennas, the wireless communication circuit being configured to transmit/receive signals having a frequency between 20 GHz to 100 GHz, and the wireless communication circuit comprising a plurality of phase shifters configured to adjust the phase of the signals to together form a directional beam;

providing a signal detecting device in a second position spaced from the first position so as to detect a radio signal from the wireless communication circuit;

causing the wireless communication circuit to transmit a first signal in a state in which the phase shifters are all configured to have a first delay;

detecting first power of the first signal by using the signal detecting device;

causing the wireless communication circuit to transmit a second signal in a state in which the phase shifters are all configured to have a second delay; and detecting second power of the second signal by using the signal detecting device.

2. The method as claimed in claim 1, wherein the difference between the first delay and the second delay is a multiple of a reference angle, and the reference angle is obtained by dividing 360° by 2 to the power of the bit number of the phase shifters.

3. The method as claimed in claim 2, further comprising detecting a current flowing through the wireless communication circuit while power is applied to the wireless communication circuit.

4. The method as claimed in claim 3, wherein the first delay is 0°, and the method further comprises determining whether or not the first power is included in a first selected section.

5. The method as claimed in claim 4, wherein the second delay is an n multiple of the reference angle, n being one of 1, 2, 4, and 8, and the method further comprises determining whether or not the second power is included in a second selected section different from the first selected section.

6. The method as claimed in claim 4, further comprising confirming the wireless communication circuit unacceptable, based on confirming that the first power is not included in the first selected section.

7. The method as claimed in claim 6, wherein the confirming the wireless communication circuit unacceptable further comprises confirming that one of remaining components included in the wireless communication circuit, other than the plurality of phase shifters, is unacceptable.

8. The method as claimed in claim 1, wherein the detecting second power of the second signal comprises identifying whether or not the second delay is 180°, when the second power is included in the second selected section.

9. The method as claimed in claim 8, further comprising confirming the wireless communication circuit normal when the second delay is 180°.

10. The method as claimed in claim 8, further comprising:
configuring the second delay to be double, when the second delay is not 180°;
causing the wireless communication circuit to transmit the second signal in a state in which the phase shifters are all configured to have double the second delay; and
detecting second power of the second signal by using the signal detecting device.

11. The method as claimed in claim 8, further comprising confirming the wireless communication circuit unacceptable when the second power is not included in the second selected section.

12. The method as claimed in claim 11, wherein the confirming the wireless communication circuit unacceptable comprises confirming that an unacceptable element is included in at least one of the plurality of phase shifters.

13. An electronic device comprising:
a wireless communication device comprising an array of antennas and a wireless communication circuit electrically connected to the array of antennas, the wireless communication circuit being configured to transmit/receive signals having a frequency between 20 GHz to 100 GHz, the wireless communication circuit comprising a plurality of phase shifters configured to adjust the phase of the signals to together form a directional beam, and each of the plurality of phase shifters comprising a designated number of PS (phase shifter) elements;
a processor operatively connected to the wireless communication device; and
a memory operatively connected to the processor,
wherein the memory is configured to store instructions that, when executed, cause the processor to:
receive information regarding an unacceptable element included in the wireless communication device from an external device, the unacceptable element comprising a PS element included in at least one of the plurality of phase shifters;
extract data related to the unacceptable element from a table stored in the memory; and
change the extracted data.

14. The electronic device as claimed in claim 13, wherein the table comprises information regarding activation of the plurality of phase shifters for forming a beam in a designated direction, and the data related to the unacceptable element comprises information instructing activation of the unacceptable element in order to form a beam in the designated direction.

15. The electronic device as claimed in claim 14, wherein the instructions are configured to cause the processor to add, to the extracted data, information instructing deactivation of the unacceptable element and information instructing activation of different elements related to the unacceptable element, thereby changing the extracted data.

16. A system for identifying characteristics of a wireless communication device, the system comprising:
the wireless communication device;
a signal detecting device; and
the characteristic identifying device,
wherein the wireless communication device comprises an array of antennas and a wireless communication circuit electrically connected to the array of antennas, the wireless communication circuit is configured to transmit/receive signals having a frequency between 20 GHz to 100 GHz, the wireless communication circuit comprises a plurality of phase shifters configured to adjust the phase of the signals to together form a directional beam;
wherein the wireless communication device is configured to transmit a first signal in a state in which the phase shifters are all configured to have a first delay and to transmit a second signal in a state in which the phase shifters are all configured to have a second delay;
wherein the signal detecting device is configured to receive the first signal and the second signal and to transmit data related to the first signal and the second signal to the characteristic identifying device; and wherein the characteristic identifying device is configured to determine power of the first signal and power of the second signal, based on the data related to the first signal and the second signal, and to identify characteristics regarding quality of the wireless communication device, based on at least one of the determined powers.

17. The system as claimed in claim 16, wherein the difference between the first delay and the second delay is a multiple of a reference angle, and the reference angle is obtained by dividing 360° by 2 to the power of the bit number of the phase shifters.

18. The system as claimed in claim 17, wherein the wireless communication device is configured to detect a current flowing through the wireless communication circuit while power is applied to the wireless communication circuit.

19. The system as claimed in claim 18, wherein the first delay is 0°, and the characteristic identifying device is configured to determine whether or not the first power is included in a first selected section.

20. The system as claimed in claim 19, wherein the second delay is an n multiple of the reference angle, n being one of 1, 2, 4, and 8, and the characteristic identifying device is configured to determine whether or not the second power is included in a second selected section different from the first selected section.

\* \* \* \* \*